United States Patent
Khoshnevisan et al.

(10) Patent No.: US 12,471,085 B2
(45) Date of Patent: Nov. 11, 2025

(54) SEPARATE DL-UL BEAM INDICATION FOR SEPARATE DL-UL TCI STATE

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US); Tao Luo, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 407 days.

(21) Appl. No.: 18/160,152

(22) Filed: Jan. 26, 2023

(65) Prior Publication Data
US 2024/0260034 A1 Aug. 1, 2024

(51) Int. Cl.
*H04W 72/1273* (2023.01)
*H04W 72/231* (2023.01)

(52) U.S. Cl.
CPC ..... *H04W 72/1273* (2013.01); *H04W 72/231* (2023.01)

(58) Field of Classification Search
CPC ............... H04W 72/23; H04W 72/231; H04W 72/1273; H04W 72/232; H04W 88/04; H04L 5/0051; H04L 5/0035
See application file for complete search history.

(56) References Cited

U.S. PATENT DOCUMENTS

| | | | |
|---|---|---|---|
| 2023/0132040 A1* | 4/2023 | Gao | H04W 72/23 370/329 |
| 2023/0144547 A1* | 5/2023 | Bhamri | H04L 5/0023 370/330 |
| 2023/0199795 A1* | 6/2023 | Zhu | H04L 5/0094 370/329 |
| 2023/0269057 A1* | 8/2023 | Sengupta | H04L 5/0092 370/329 |
| 2024/0039582 A1* | 2/2024 | Shahmohammadian | H04W 72/23 |
| 2024/0137099 A1* | 4/2024 | Hakola | H04W 8/22 |
| 2024/0147490 A1* | 5/2024 | Zhu | H04L 5/0053 |
| 2024/0259172 A1 | 8/2024 | Khoshnevisan et al. | |
| 2024/0306003 A1* | 9/2024 | Deghel | H04W 76/20 |
| 2024/0357689 A1* | 10/2024 | Nilsson | H04L 5/0053 |

(Continued)

OTHER PUBLICATIONS

3GPP: "3rd Generation Partnership Project, Technical Specification Group Radio Access Network, NR, Medium Access Control (MAC) protocol specification (Release 17)", 3GPP TS 38.321, V17.3.0, Dec. 2022, pp. 1-249, Sections 6.1.3.14, 6.1.3.24, 6.1.3.47, 6.1.3.59, 6.1.3.60.

(Continued)

*Primary Examiner* — Andrew Lee
(74) *Attorney, Agent, or Firm* — Procopio, Cory, Hargreaves & Savitch LLP

(57) ABSTRACT

Method and apparatus for separate downlink/uplink beam indication for separate downlink/uplink TCI states. The apparatus receives an activation command activating at least one of one or more downlink TCI states, or one or more uplink TCI states. The apparatus applies at least one of the one or more downlink TCI states or the one or more uplink TCI states based on the activation command and a condition for separate downlink/uplink unified TCI.

20 Claims, 16 Drawing Sheets

(56) References Cited

U.S. PATENT DOCUMENTS

2025/0048287 A1\* 2/2025 Cirik .................... H04L 5/0053
2025/0062818 A1\* 2/2025 Gao ..................... H04L 5/0053

OTHER PUBLICATIONS

3GPP: "3rd Generation Partnership Project, Technical Specification Group Radio Access Network, NR, Multiplexing and Channel Coding (Release 17)", T8 38.212 V17.4.0, Dec. 2022, 202 Pages, Sections 7.3.12.2 and 7.3.12.3.

3GPP: "3rd Generation Partnership Project, Technical Specification Group Radio Access Network, NR, Radio Resource Control (RRC) Protocol Specification (Release 17)", TS 38.331 V17.3.0, Dec. 2022, pp. 1-1318, Section 6.3.2.

\* cited by examiner

700

MAC-CE activated
TCI codepoints
702

| TCI codepoint | TCI states |
|---|---|
| 0 (000) | DL TCI state 1 / UL TCI state 1 |
| 1 (001) | DL TCI state 1 / UL TCI state 2 |
| 2 (010) | DL TCI state 1 / UL TCI state 3 |
| 3 (011) | DL TCI state 1 / UL TCI state 4 |
| 4 (100) | DL TCI state 1 / UL TCI state 5 |
| 5 (101) | DL TCI state 1 / UL TCI state 6 |
| 6 (110) | DL TCI state 1 / UL TCI state 7 |
| 7 (111) | DL TCI state 1 / UL TCI state 8 |

MAC-CE activated
TCI codepoints
712

| TCI codepoint | TCI states |
|---|---|
| 0 (000) | DL TCI state 1 |
| 1 (001) | UL TCI state 1 |
| 2 (010) | UL TCI state 2 |
| 3 (011) | UL TCI state 3 |
| 4 (100) | UL TCI state 4 |
| 5 (101) | UL TCI state 5 |
| 6 (110) | UL TCI state 6 |
| 7 (111) | UL TCI state 7 |

MAC-CE activated
TCI codepoints
722

| TCI codepoint | TCI states |
|---|---|
| NA | DL TCI state 1 |
| 0 (000) | UL TCI state 1 |
| 1 (001) | UL TCI state 2 |
| 2 (010) | UL TCI state 3 |
| 3 (011) | UL TCI state 4 |
| 4 (100) | UL TCI state 5 |
| 5 (101) | UL TCI state 6 |
| 6 (110) | UL TCI state 7 |
| 7 (111) | UL TCI state 8 |

FIG. 7C

SEPARATE DL-UL BEAM INDICATION FOR SEPARATE DL-UL TCI STATE

TECHNICAL FIELD

The present disclosure relates generally to communication systems, and more particularly, to a configuration for separate downlink/uplink beam indication for separate downlink/uplink transmission configuration indicator (TCI) states.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus receives an activation command activating at least one of one or more downlink transmission configuration indicator (TCI) states, or one or more uplink TCI states. The apparatus applies at least one of the one or more downlink TCI states or the one or more uplink TCI states based on the activation command and a condition for separate downlink/uplink unified TCI.

In an aspect of the disclosure, a method, a computer-readable medium, and an apparatus are provided. The apparatus may be a device at a network node. The device may be a processor and/or a modem at a network node or the network node itself. The apparatus providing an activation command activating, for a user equipment (UE), at least one of one or more downlink transmission configuration indicator (TCI) states, or one or more uplink TCI states. The apparatus communicates with the UE based on at least one of the one or more downlink TCI states or the one or more uplink TCI states based on the activation command and a condition for separate downlink/uplink unified TCI.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 7A is a diagram illustrating an example of downlink and uplink TCI states.

FIG. 7B is a diagram illustrating an example of downlink and uplink TCI states.

FIG. 7C is a diagram illustrating an example of downlink and uplink TCI states.

DETAILED DESCRIPTION

Figure 1:
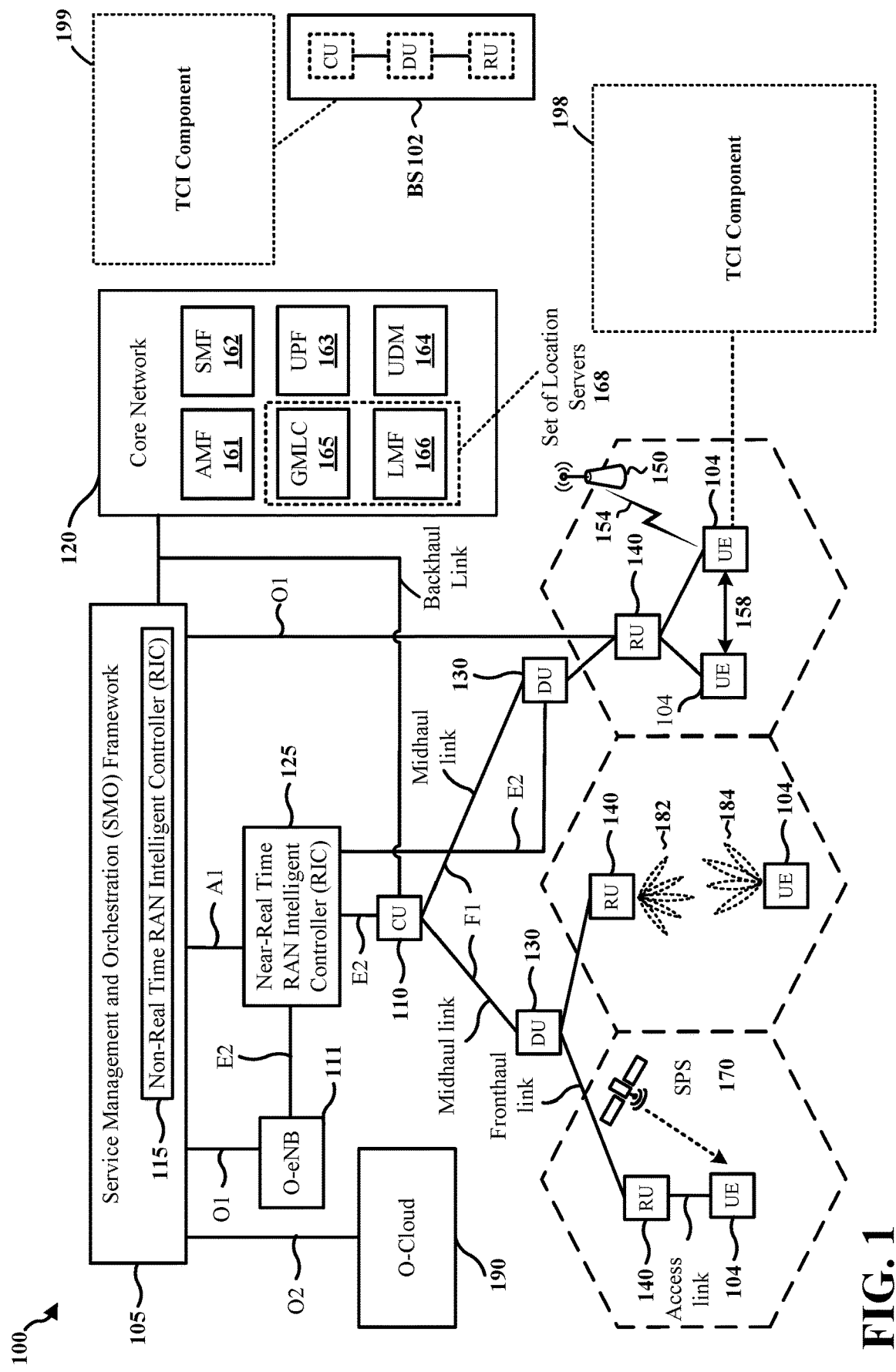
FIG. 1 is a diagram illustrating an example of a wireless communications system and an access network.

An uplink dense configuration may be deployed in order to improve uplink coverage or capacity. A UE's uplink signals or channels may be received by one of the one or more TRPs. Downlink signals or channels may be transmitted from the network entity to the UE, while each of the one or more TRPs have a connection to the base station via backhaul. The uplink dense configuration may reduce the uplink path loss, which may be helpful when uplink coverage is a bottleneck or a cause of delay. The one or more TRPs operating as the uplink reception nodes receive the uplink signal from the UE and provide the uplink signal from the UE to the network entity via the backhaul connection.

In instances where the downlink TRPs (e.g., network entity, base station) and the uplink TRPs (e.g., uplink only TRP) are not the same, then unified TCI with separate downlink and/or uplink TCI states may be used. However, some issues may arise. For example, the UE may be activated with one downlink TCI state and multiple uplink TCI states in instances where an uplink dense configuration is deployed. Separate downlink and/or uplink beam indications may be utilized to overcome such instances. In some instances, if an activation command maps a downlink TCI state and/or an uplink TCI state to only one TCI codepoint, the UE may apply the indicated downlink TCI state and/or the uplink TCI state to one or to a set of component carriers or downlink BWPs, and if applicable, to one or a set of component carriers or uplink BWPs once the indicated mapping for the one single TCI codepoint is applied.

Aspects presented herein provide a configuration for separate downlink/uplink beam indication for separate downlink/uplink TCI states. A UE may be configured to apply at least one of one or more downlink TCI states or one or more uplink TCI states based on an activation command and a condition for separate downlink/uplink unified TCI. The activation command may indicate at least one of one or more downlink TCI states or one or more uplink TCI states. The activation command and the condition may be utilized to determine the uplink and/or downlink TCI states and to allow the command to activate TCI states for various scenarios including uplink dense deployments. This enables more efficient signaling for TCI state activation among various types of deployments.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25

GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHZ), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may comprise a TCI component 198 configured to receive an activation command activating at least one of one or more downlink TCI states, or one or more uplink TCI states; and apply at least one of the one or more downlink TCI states or the one or more uplink TCI states based on the activation command and a condition for separate downlink/uplink unified TCI.

Referring again to FIG. 1, in certain aspects, the base station 102 may comprise a TCI component 199 configured to provide an activation command activating, for a user equipment (UE), at least one of one or more downlink transmission configuration indicator (TCI) states, or one or more uplink TCI states; and communicating with the UE based on at least one of the one or more downlink TCI states or the one or more uplink TCI states based on the activation command and a condition for separate downlink/uplink unified TCI.

Although the following description may be focused on 5G NR, the concepts described herein may be applicable to other similar areas, such as LTE, LTE-A, CDMA, GSM, and other wireless technologies.

Figure 2:
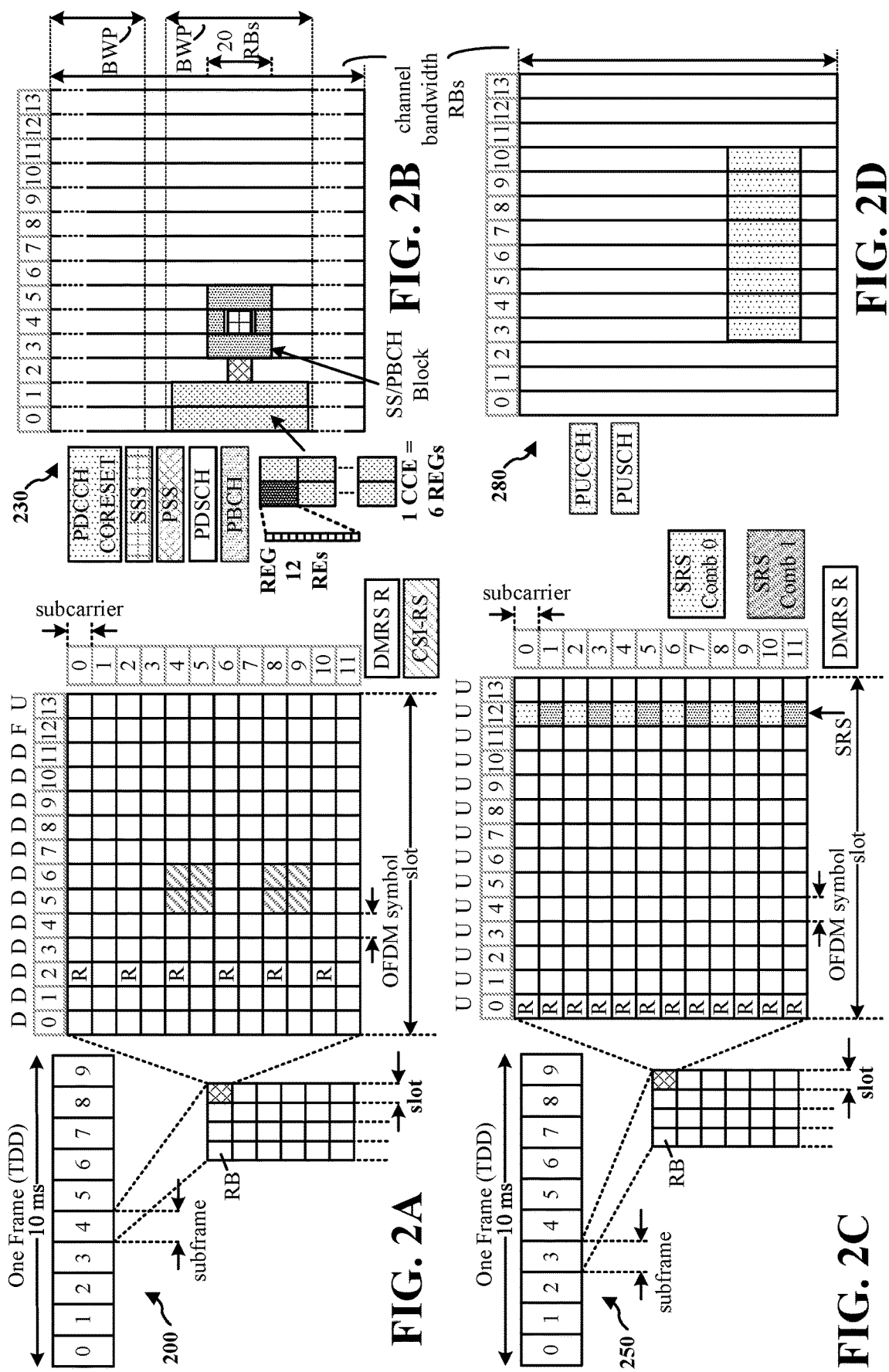
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
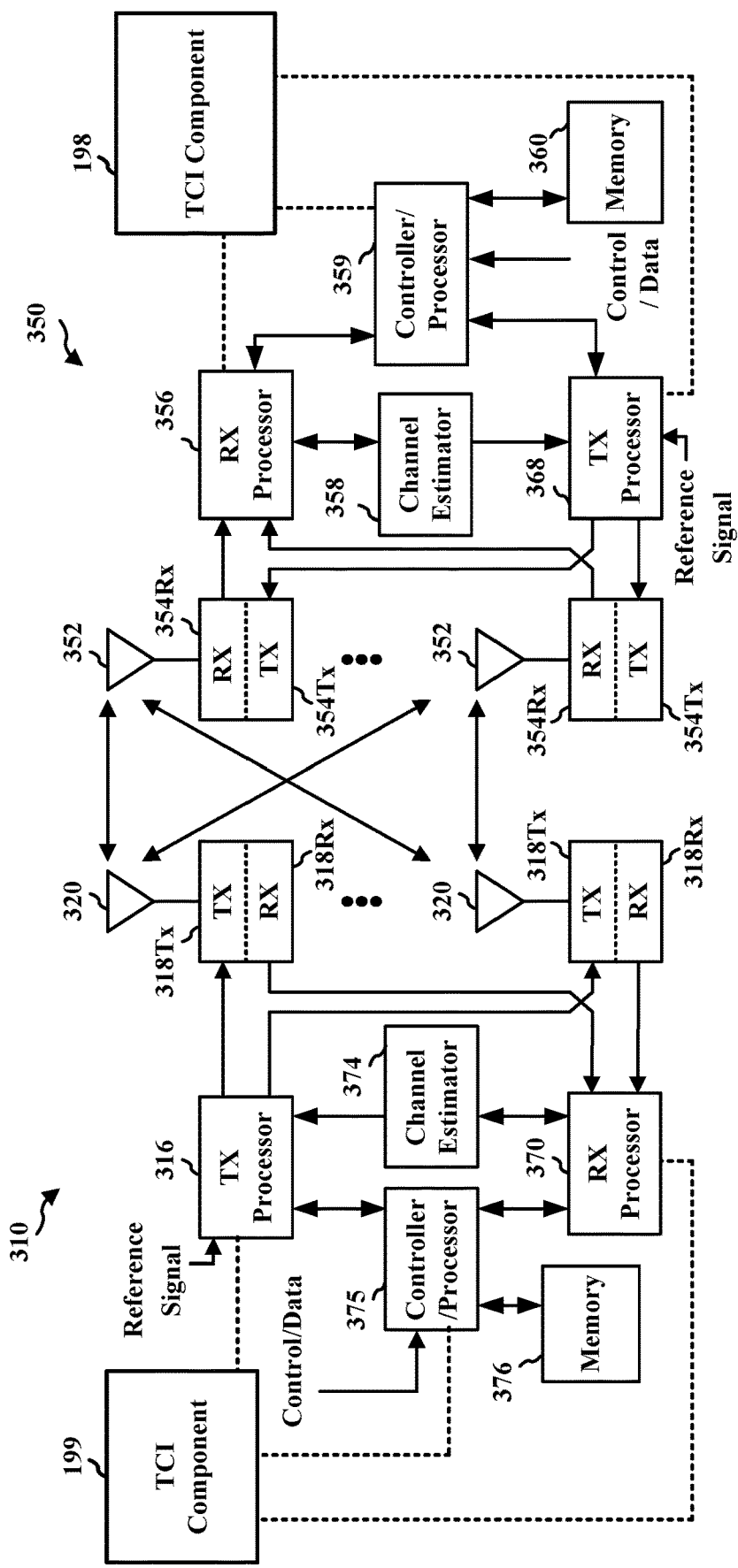
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the TCI component 198 of FIG. 1.

At least one of the TX processor 316, the RX processor 370, and the controller/processor 375 may be configured to perform aspects in connection with the TCI component 199 of FIG. 1.

Figure 4:
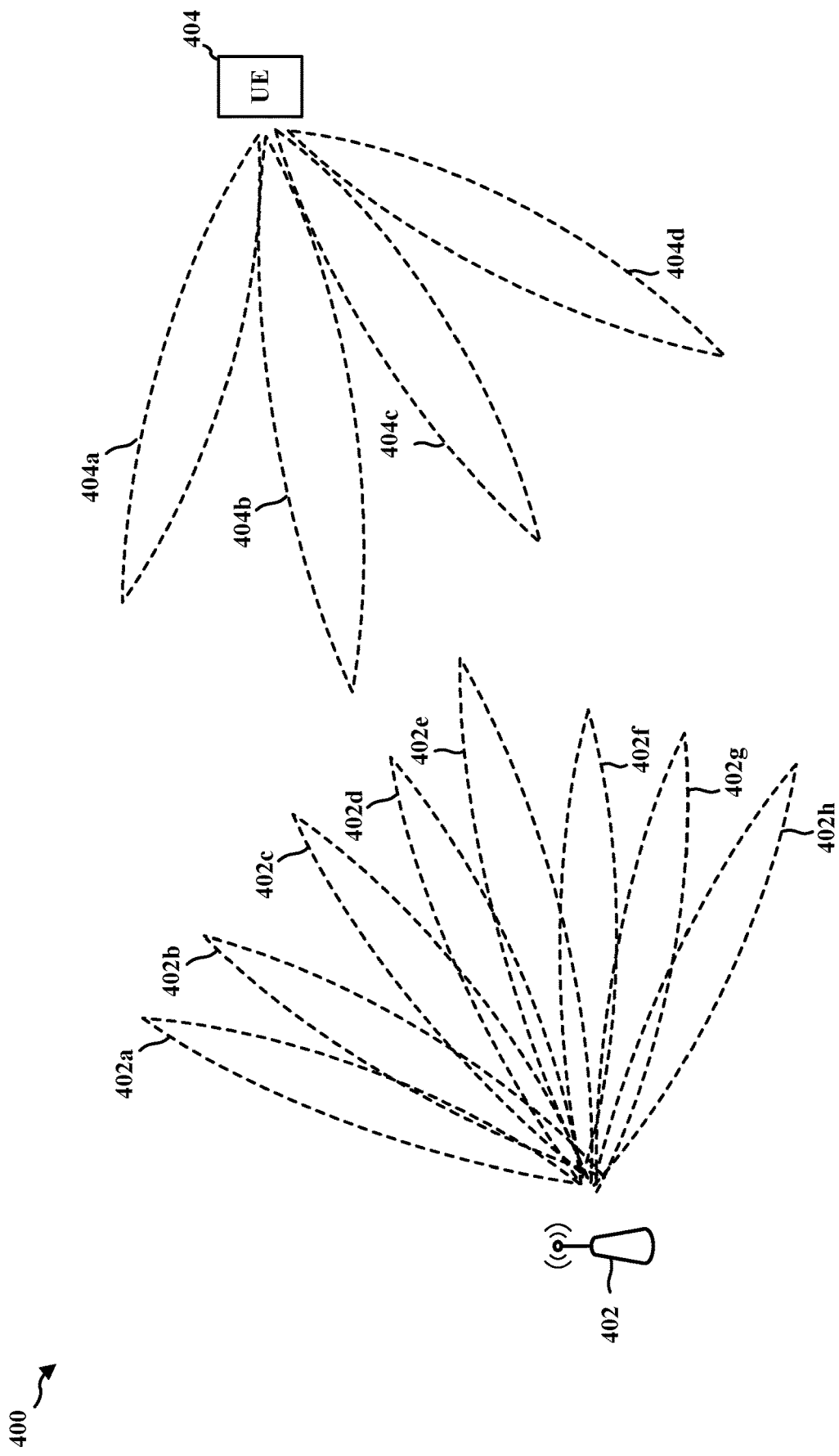
FIG. 4 is a diagram illustrating a base station in communication with a UE via a set of beams.

As described in connection with example 400 in FIG. 4, the base station 402 and UE 404 may communicate over active data/control beams both for DL communication and UL communication. The base station and/or UE may switch to a new beam direction using beam failure recovery procedures. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In response to different conditions, the UE 404 may determine to switch beams, e.g., between beams 402a-402h. The beam at the UE 404 may be used for reception of downlink communication and/or transmission of uplink communication. In some examples, the base station 402 may send a transmission that triggers a beam switch by the UE 404. For example, the base station 402 may indicate a transmission configuration indication (TCI) state change, and in response, the UE 404 may switch to a new beam for the new TCI state of the base station 402. In some instances, a UE may receive a signal, from a base station, configured to trigger a transmission configuration indication (TCI) state change via, for example, a MAC control element (CE) command. The TCI state change may cause the UE to find the best UE receive beam corresponding to the TCI state from the base station, and switch to such beam. Switching beams may allow for enhanced or improved connection between the UE and the base station by ensuring that the transmitter and receiver use the same configured set of beams for communication. In some aspects, a single MAC-CE command may be sent by the base station to trigger the changing of the TCI state on multiple CCs.

A TCI state may include quasi co-location (QCL) information that the UE can use to derive timing/frequency error and/or transmission/reception spatial filtering for transmitting/receiving a signal. Two antenna ports are said to be quasi co-located if properties of the channel over which a symbol on one antenna port is conveyed can be inferred from the channel over which a symbol on the other antenna port is conveyed. The base station may indicate a TCI state to the UE as a transmission configuration that indicates QCL relationships between one signal (e.g., a reference signal) and the signal to be transmitted/received. For example, a TCI state may indicate a QCL relationship between DL RSs in one RS set and PDSCH/PDCCH DM-RS ports. TCI states can provide information about different beam selections for the UE to use for transmitting/receiving various signals.

In some wireless communication systems, such as a wireless communication system under a unified TCI framework, a pool of joint DL/UL TCI states may be used for joint DL/UL TCI state updates for beam indication. For example, the base station 402 may transmit a pool of joint DL/UL TCI states to the UE 404. The UE 404 may determine to switch transmission beams and/or reception beams based on the joint DL/UL TCI states. In some aspects, the TCI state pool for separate DL and UL TCI state updates may be used. In some aspects, the base station 402 may use RRC signaling to configure the TCI state pool. In some aspects, the joint TCI may or may not include UL specific parameter(s) such as UL PC/timing parameters, PLRS, panel-related indication, or the like. If the joint TCI includes the UL specific parameter(s), the parameters may be used for the UL transmission of the DL and UL transmissions to which the joint TCI is applied.

Under a unified TCI framework, different types of common TCI states may be indicated. For example, a type 1 TCI may be a joint DL/UL common TCI state to indicate a common beam for at least one DL channel or RS and at least one UL channel or RS. A type 2 TCI may be a separate DL (e.g., separate from UL) common TCI state to indicate a common beam for more than one DL channel or RS. A type 3 TCI may be a separate UL common TCI state to indicate a common beam for more than one UL channel/RS. A type 4 TCI may be a separate DL single channel or RS TCI state to indicate a beam for a single DL channel or RS. A type 5 TCI may be a separate UL single channel or RS TCI state to indicate a beam for a single UL channel or RS. A type 6 TCI may include UL spatial relation information (e.g., such as sounding reference signal (SRS) resource indicator (SRI)) to indicate a beam for a single UL channel or RS. An example RS may be an SSB, a tracking reference signal (TRS) and associated CSI-RS for tracking, a CSI-RS for beam management, a CSI-RS for CQI management, a DM-RS associated with non-UE-dedicated reception on PDSCH and a subset (which may be a full set) of control resource sets (CORESETs), or the like. A TCI state may be defined to represent at least one source RS to provide a reference (e.g., UE assumption) for determining quasi-co-location (QCL) or spatial filters. For example, a TCI state may define a QCL assumption between a source RS and a target RS.

Before receiving a TCI state, a UE may assume that the antenna ports of one DM-RS port group of a PDSCH are spatially quasi-co-located (QCLed) with an SSB determined in the initial access procedure with respect to one or more of: a Doppler shift, a Doppler spread, an average delay, a delay spread, a set of spatial Rx parameters, or the like. After receiving the new TCI state, the UE may assume that the antenna ports of one DM-RS port group of a PDSCH of a serving cell are QCLed with the RS(s) in the RS set with respect to the QCL type parameter(s) given by the indicated TCI state. Regarding the QCL types, QCL type A may include the Doppler shift, the Doppler spread, the average delay, and the delay spread; QCL type B may include the Doppler shift and the Doppler spread; QCL type C may include the Doppler shift and the average delay; and QCL type D may include the spatial Rx parameters (e.g., associated with beam information such as beamforming properties for finding a beam).

In another aspect, a spatial relation change, such as a spatial relation update, may trigger the UE to switch beams. Beamforming may be applied to uplink channels, such as but not limited to PUCCH. Beamforming may be based on configuring one or more spatial relations between the uplink and downlink signals. Spatial relation indicates that a UE may transmit the uplink signal using the same beam as it used for receiving the corresponding downlink signal.

In another aspect, the base station 402 may change a pathloss reference signal configuration that the UE uses to determine power control for uplink transmissions, such as SRS, PUCCH, and/or PUSCH. In response to the change in the pathloss reference signal, the UE 404 may determine to switch to a new beam.

Figure 5:
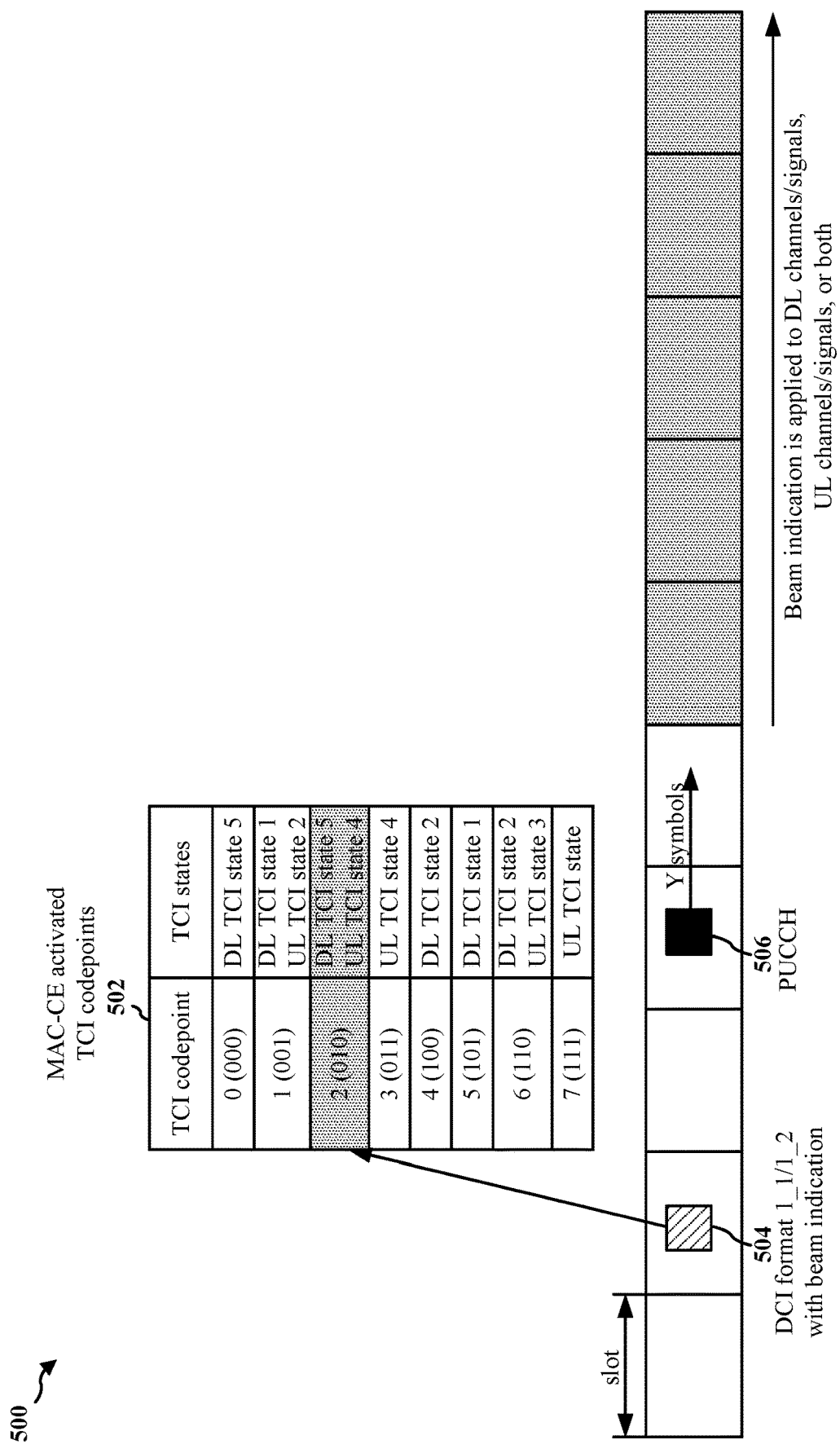
FIG. 5 is a diagram illustrating an example of unified TCI.

For systems utilizing unified TCI, the unified TCI may include DL TCI states, UL TCI states, or joint DL/UL TCI states which may be configured via RRC signaling. The MAC-CE may activate a number of RRC configured TCI states and map to TCI field codepoints with one or more of the following possibilities: one TCI field codepoint represents a joint DL/UL TCI state: Used for joint DL/UL beam indication; one TCI field codepoint represents a pair of DL TCI state and UL TCI state (e.g., used for separate DL/UL beam indication); one TCI field codepoint represents only a DL TCI state: Used for only DL beam indication; or one TCI field codepoint represents only an UL TCI state (e.g., used for UL beam indication). In some instances, if the MAC-CE indicates the mapping to only a single TCI field codepoint, then the single TCI field codepoint may serve as a beam indication. For example, a period of time (e.g., 3 ms) after a HARQ-ACK to PDSCH carrying the MAC-CE, the beam indication may be applied. In some instances, if the MAC-CE indicates a mapping to more than one TCI field codepoint DL DCI (e.g., DCI format 1_1 or 1_2) with or without a DL assignment can indicate a beam through the TCI field codepoint. For example, the beam indication may be applied in a first slot that is at least Y symbols (e.g., RRC configured based on UE capability) after the last symbol of the PUCCH carrying the HARQ-ACK in response to the DCI, as shown, for example, in diagram 500 of FIG. 5. With reference to FIG. 5, a DCI 504 may comprise DCI format 1_1 or 1_2 with a beam indication. The DCI 504 may or may not schedule a PDSCH. The DCI 504 may comprise a TCI field codepoint that may be mapped to the MAC-CE activated TCI codepoints 502. The PUCCH 506 may comprise a HARQ-ACK in response to the DCI 504. A beam indication may be applied in the first slot that is at least Y symbols after the last symbol of the PUCCH 506. The beam indication may be applied to DL channels/signals, UL channels/signals, or both. The beam indication may be applied to DL channels/signals, UL channels/signals, or both based on the type of TCI field codepoint.

The type of unified TCI may be configured, per component carrier, as either separate or joint (e.g., unifiedTCI-StateType-r17). The state type may be enumerated as separate or joint. In instances of separate DL/UL unified TCI, each TCI codepoint may be mapped to at least one of one DL TCI state; one UL TCI state; one DL TCI state and one UL TCI state; two DL TCI states, or two DL TCI states and one UL TCI state (e.g., for DL multiple transmission reception points (mTRP)); two UL TCI states, or two UL TCI states and one DL TCI state (e.g., for UL mTRP); two DL TCI states and two UL TCI states (e.g., for DL and UL mTRP). If the MAC-CE maps a DL TCI state or an UL TCI state to a single TCI codepoint, the single TCI codepoint may be applied to DL or UL signals/channels. In such instances, a DCI based beam indication may not be needed. Otherwise a DCI with a TCI field may be configured to indicate one of the TCI codepoints. In some instances, if the activation command maps TCI state and/or UL TCI state to only one TCI codepoint, the UE may apply the indicated TCI state and/or UL TCI state to one or to a set of CCs/DL BWPs, and if applicable, to one or to a set of CCs/UL BWPs once the indicated mapping for the one single TCI codepoint is applied.

Figure 6:
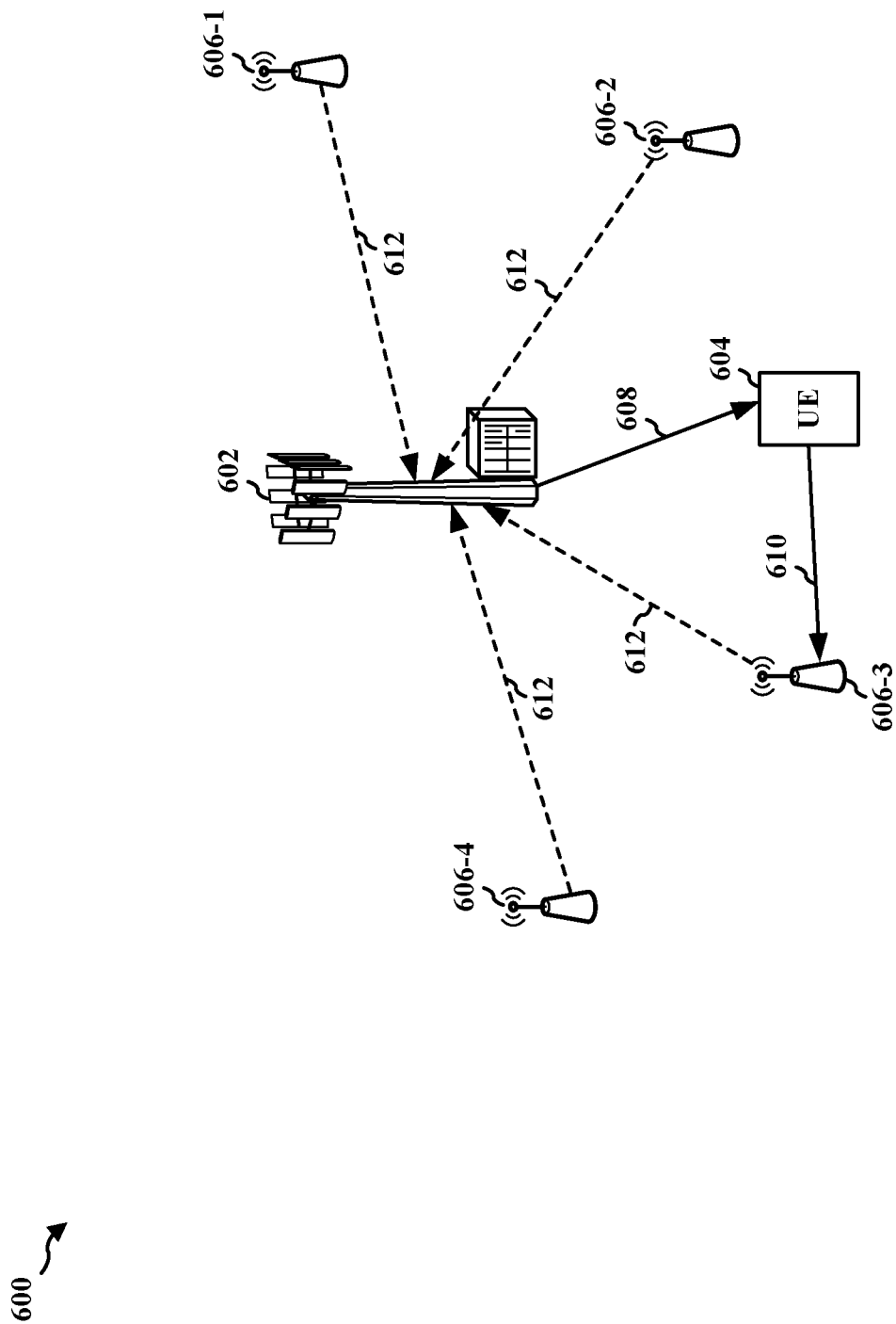
FIG. 6 is a diagram illustrating an example of an uplink dense configuration.

FIG. 6 illustrates an example of an uplink dense configuration. The diagram 600 of FIG. 6 includes a network entity 602 (e.g., base station), a UE 604, and one or more TRPs 606-1, 606-2, 606-3, 606-4. An uplink dense configuration may be deployed in order to improve uplink coverage or capacity. A UE's uplink signals or channels may be received by one of the one or more TRPs. Downlink signals or channels may be transmitted from the network entity to the UE, while each of the one or more TRPs have a connection to the base station via backhaul. The uplink dense configuration may reduce the uplink path loss, which may be helpful when uplink coverage is a bottleneck or a cause of delay. The uplink dense configuration may also assist in terms of deployment cost or complexity due in part to the one or more TRPs operating as uplink reception nodes and do not transmit any downlink signals. As such, the one or more TRPs operating as the uplink reception nodes receive the uplink signal from the UE and provide the uplink signal from the UE to the network entity via the backhaul connection. In some aspects, the one or more TRPs operating as the uplink reception node may process the uplink signal from the UE prior to providing the uplink signal to the network entity. In some aspects, the one or more TRPs operating as the uplink reception node do not process the uplink signal from the UE prior to providing the uplink signal to the network entity. With reference to diagram 600 of FIG. 6, the network entity 602 may provide downlink signals 608 to the UE 604. The UE 604 may transmit uplink signal 610 to the TRP 606-3. The one or more TRPs (e.g., 606-1, 606-2, 606-3, 606-4) may be configured for uplink reception only and may each have a backhaul connection 612 with the network entity 602. The TRP 606-3 may provide the uplink signal 610, obtained from the UE 604, to the network entity 602 via the backhaul connection 612.

In some aspects, the UE may be configured with a plurality of uplink carriers (e.g., supplementary uplink). For example, the UE may be configured with two uplink carriers for one downlink signal of the same serving cell, and uplink transmissions on the two uplink carriers are not simultaneous. For example, for time division duplex frequency band and supplementary uplink, the UE may transmit uplink either on the time division duplex frequency band or on the supplementary uplink carrier. In both instances, the activated or indicated downlink beams and the uplink beams are not the same.

In instances where the downlink TRPs (e.g., network entity, base station) and the uplink TRPs (e.g., uplink only TRP) are not the same, then unified TCI with separate downlink and/or uplink TCI states may be used. However, some issues may arise. For example, the UE may be activated with one downlink TCI state and multiple uplink TCI states in instances where an uplink dense configuration is deployed. Separate downlink and/or uplink beam indications may be utilized to overcome such instances. In some instances, if an activation command maps a downlink TCI state and/or an uplink TCI state to only one TCI codepoint, the UE may apply the indicated downlink TCI state and/or the uplink TCI state to one or to a set of component carriers or downlink BWPs, and if applicable, to one or a set of component carriers or uplink BWPs once the indicated mapping for the one single TCI codepoint is applied.

Aspects presented herein provide a configuration for separate downlink/uplink beam indication for separate downlink/uplink TCI states. A UE may be configured to apply at least one of one or more downlink TCI states or one or more uplink TCI states based on an activation command and a condition for separate downlink/uplink unified TCI. The activation command may indicate at least one of one or more downlink TCI states or one or more uplink TCI states. The activation command and the condition may be utilized to determine the uplink and/or downlink TCI states and to allow the command to activate TCI states for various scenarios including uplink dense deployments. This enables more efficient signaling for TCI state activation among various types of deployments.

FIGS. 7A, 7B, and 7C illustrate examples of mapping of TCI states based on activated TCI codepoints. In instances for separate downlink or uplink unified TCI, the UE may apply a MAC-CE indicated downlink TCI state or an uplink TCI state to the downlink or uplink signals or channels. In some aspects, the UE may apply the indicated downlink TCI state or the uplink TCI state to the downlink or uplink signals or channels if a single TCI codepoint is activated by the MAC-CE. In such instances, the single codepoint may be mapped to one downlink TCI state and to one uplink TCI state.

In some aspects, the UE may apply the indicated downlink TCI state or the uplink TCI state to the downlink or uplink signals or channels if a single downlink TCI state is mapped to a single TCI codepoint, then the downlink TCI state is applied to downlink signals or channels. If a single uplink TCI state is mapped to a single TCI codepoint, then the uplink TCI state is applied to the uplink signals or channels.

In some aspects, the UE may apply the indicated downlink TCI state or the uplink TCI state to the downlink or uplink signals or channels if a single downlink TCI state is activated by the MAC-CE, the downlink TCI state is applied to downlink signals or channels. If a single uplink TCI state is activated by the MAC-CE, the uplink TCI state is applied to downlink signals or channels.

For example, with reference to FIG. 7A, the diagram 700 includes activated TCI codepoints 702. The TCI codepoints 702 may be activated via MAC-CE. In instances where a single codepoint is activated, the downlink TCI state 1 is not applied. In instances where a single downlink TCI state is mapped to a single TCI codepoint, the downlink TCI state 1 is not applied. In instances where a single downlink TCI state is activated, the downlink TCI state 1 may be applied.

With reference to FIG. 7B, the diagram 710 includes activated TCI codepoints 712, which may be activated via MAC-CE. In instances where a single codepoint is activated, the downlink TCI state 1 is not applied. In instances where a single downlink TCI state is mapped to a single TCI codepoint, the downlink TCI state 1 may be applied. In instances where a single downlink TCI state is activated, the downlink TCI state 1 may be applied.

In some aspects, for example for separate downlink or uplink unified TCI, if a MAC-CE indicates a single downlink TCI state or a single uplink TCI state, such TCI state may not be mapped to any TCI codepoint. This may allow for a savings in MAC-CE overhead. For example, 1+8 TCI states may be indicated, as shown for example in diagram 720 of FIG. 7C, instead of indicating 8+8 TCI states. In some aspects, the number of usable TCI codepoints that may be indicated by DCI may be increased by 1. For example, an uplink TCI state 8 may be added as a last codepoint, as shown for example in diagram 720 of FIG. 7C.

With reference to FIG. 7C, the diagram 720 includes activated TCI codepoints 722, which may be activated via MAC-CE. If a MAC-CE indicates a single downlink TCI state or a single uplink TCI state, such particular single downlink TCI state or single uplink TCI state is not mapped to any codepoint.

Figure 8:
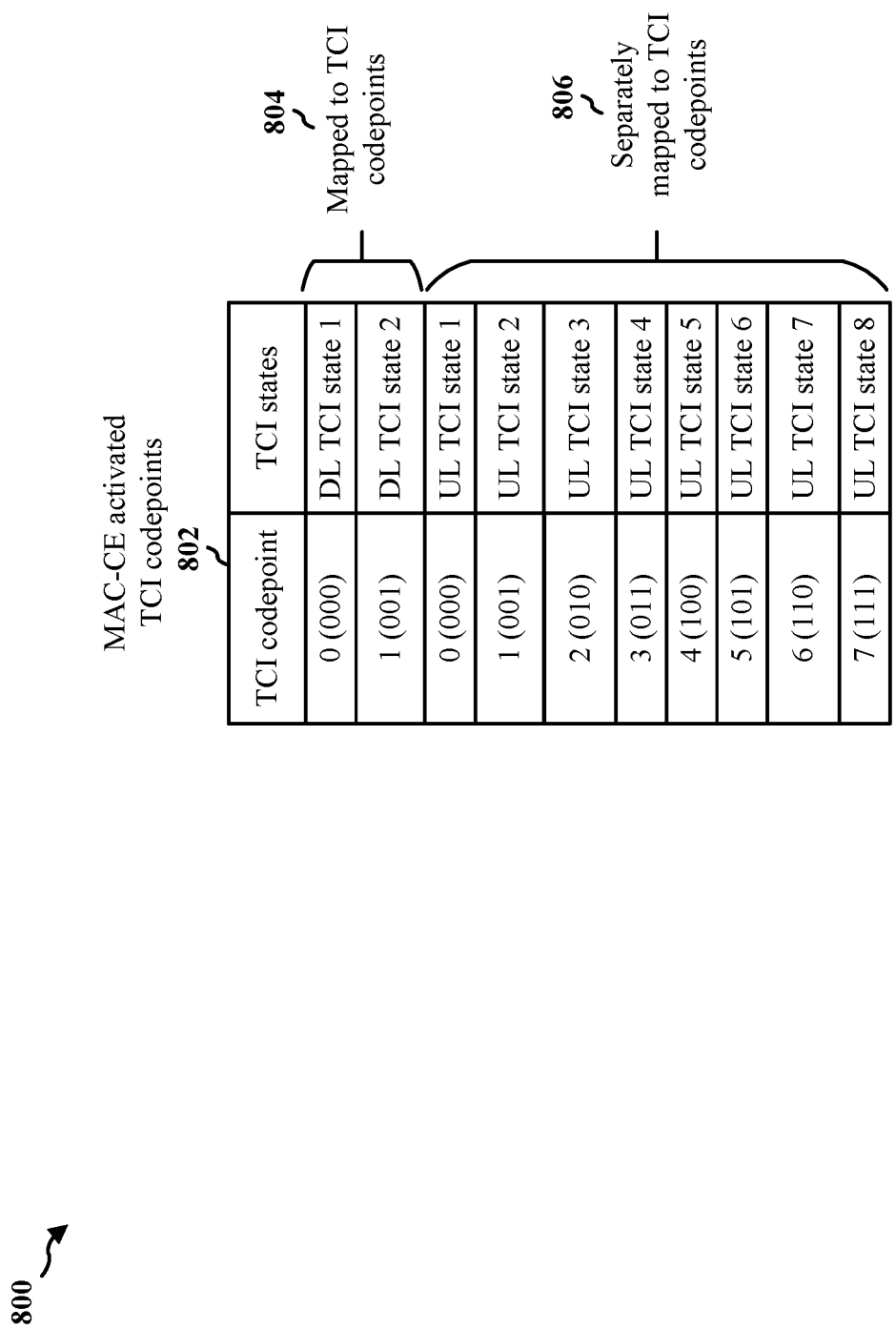
FIG. 8 is a diagram illustrating an example of downlink and uplink TCI states.
Figure 9:
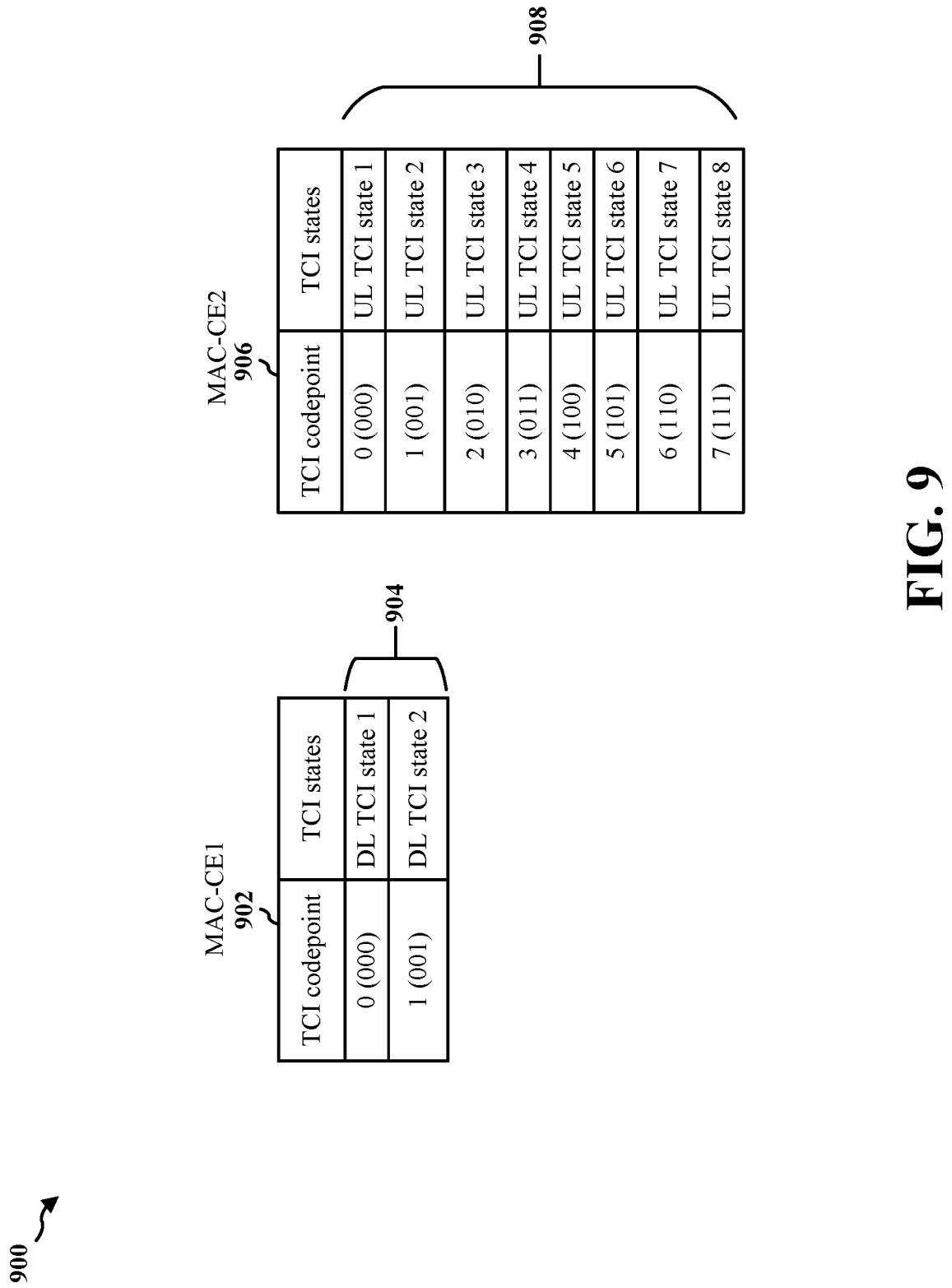
FIG. 9 is a diagram illustrating an example of downlink and uplink TCI states.

FIGS. 8 and 9 illustrate examples of TCI states mapped to TCI codepoints. In some aspects, such as for separates downlink or uplink unified TCI, downlink TCI states may be mapped to TCI codepoints starting from codepoint 0 (e.g., downlink TCI codepoints), and uplink TCI states may be mapped to TCI codepoints separately starting from codepoint 0 (e.g., uplink TCI codepoints). In some aspects, the MAC-CE may comprise an indication. For example, a MAC-CE may indicate both the set of downlink TCI states and the set of uplink TCI states, but the mapping to TCI codepoints may be separate. For example, with reference to diagram 800 of FIG. 8, the MAC-CE may indicate the activated TCI codepoints 802, where the activated TCI codepoints 802 comprise a first set 804 of downlink TCI states and a second set 806 of uplink TCI states. In some aspects, a first MAC-CE may indicate a set of downlink TCI states and a second MAC-CE may indicate a set of uplink TCI states. The MAC-CE may comprise a field indicating whether the MAC-CE indicates TCI state identifiers (IDs) correspond to downlink or uplink. For example, with reference to diagram 900 of FIG. 9, a first MAC-CE 902 (e.g., MAC-CE1) may indicate a first set 904 of downlink TCI states and a second MAC-CE 906 (e.g., MAC-CE2) may indicate a second set 908 of uplink TCI states.

In some aspects, determination of whether the indicated TCI codepoint of a TCI field of the DCI is a downlink beam indication or an uplink beam indication may be based on the DCI. For example, a DCI format may indicate TCI codepoints that correspond to downlink TCI states, while another DCI format may indicate TCI codepoints that correspond to uplink TCI states. In some aspects, DCI format 1_1 or DCI format 1_2 may indicate TCI codepoints that correspond to downlink TCI states or uplink TCI states. In some aspects, a DCI format for scheduling PDSCH (e.g, DCI format 1_1 or DCI format 1_2) or a DCI format for scheduling PUSCH (e.g., DCI format 0_1 or DCI format 0_2) may indicate TCI codepoints that correspond to downlink TCI states or uplink TCI states. In some aspects, determination of whether the indicated TCI codepoint of a TCI field of the DCI is a downlink beam indication or an uplink beam indication may be based whether DCI format 1_1 or DCI format 1_2 schedules PDSCH or not. For example, if the DCI format schedules PDSCH, the TCI field of the DCI may indicate a downlink TCI codepoint. If the DCI format does not schedule PDSCH, the TCI field of the DCI may indicate an uplink TCI codepoint. In some aspects, determination of whether the indicated TCI codepoint of a TCI field of the DCI is a downlink beam indication or an uplink beam indication may be based explicit indication by the DCI. For example, the DCI may comprise a bit field that indicates that the TCI field of the DCI is for downlink or uplink. This may be used for instances where the DCI format 1_1 or DCI format 1_2 does not schedule PDSCH. In instances where DCI format 1_1 or DCI format 1_2 schedules PDSCH, the TCI field of the DCI may indicate a downlink TCI codepoint, but if the DCI format does not schedule PDSCH, then the TCI field of the DCI may indicate an uplink TCI codepoint. In some aspects, indication of downlink TCI codepoints or uplink TCI codepoints may be configured via RRC signaling.

Figure 10:
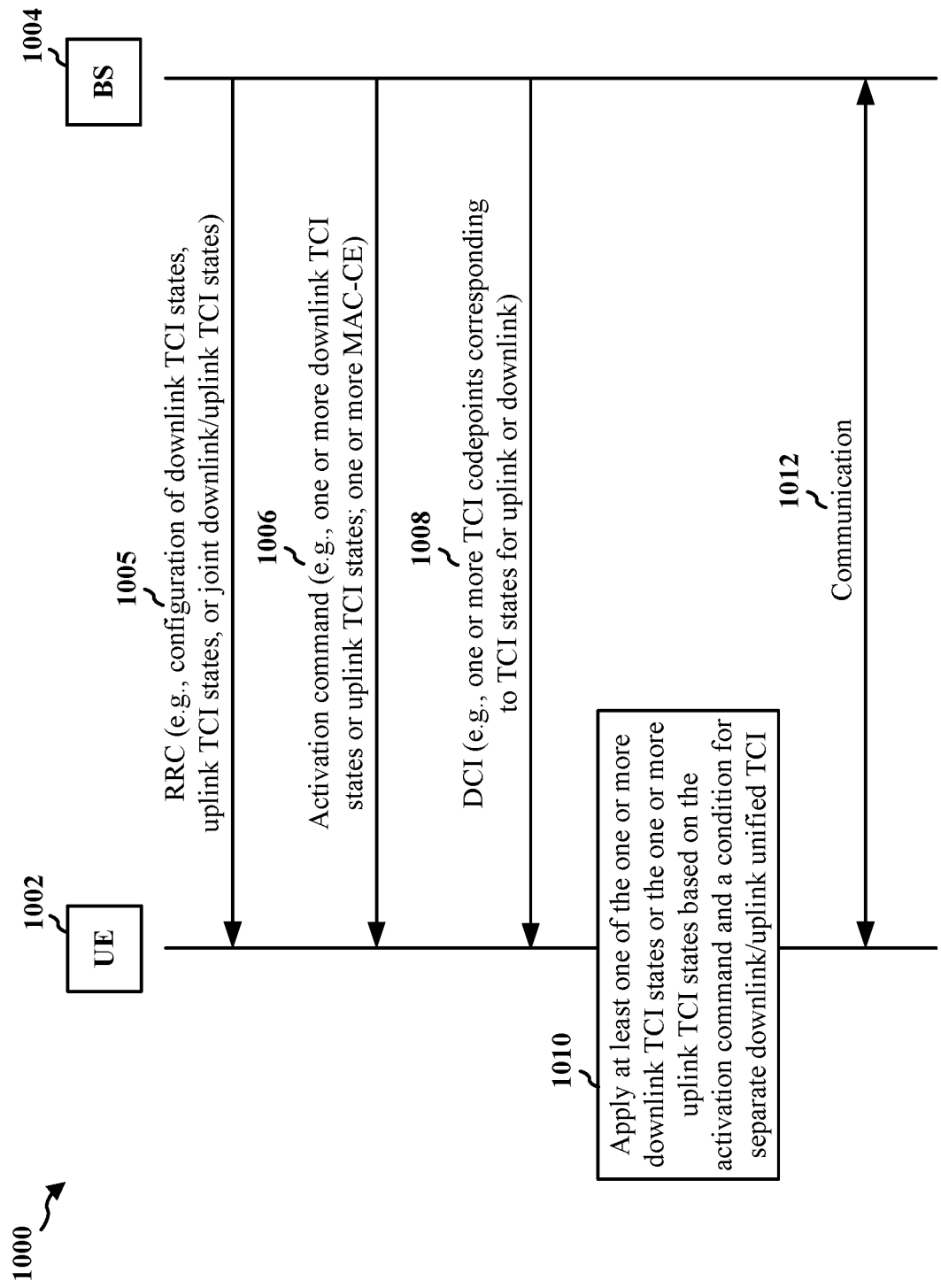
FIG. 10 is a call flow diagram of signaling between a UE and a base station.

FIG. 10 is a call flow diagram 1000 of signaling between a UE 1002 and a base station 1004. Although illustrated as a base station, one or more of the aspects may be performed by a base station in aggregated form or by a component of a base station, such as a CU 110, DU 130, or RU 140. The base station 1004 may be configured to provide at least one cell. The UE 1002 may be configured to communicate with the base station 1004. For example, in the context of FIG. 1, the base station 1004 may correspond to base station 102 and. Further, a UE 1002 may correspond to at least UE 104. In another example, in the context of FIG. 3, the base station 1004 may correspond to base station 310 and the UE 1002 may correspond to UE 350.

At 1005, the base station 1004 may provide an RRC configuration. The RRC configuration may configure at least one or more of downlink TCI states, uplink TCI states, or joint downlink/uplink TCI states. At 1006, the base station 1004 may provide an activation command. The network entity may provide the activation command activating, for a UE, at least one of one or more downlink TCI states or one or more uplink TCI states, as shown in connection with FIGS. 7A-9. The network entity may provide the activation command to the UE 1002. The UE 1002 may receive the activation command from the base station 1004.

In some aspects, the base station 1004 may provide a single MAC-CE. The base station may provide the single MAC-CE to the UE 1002, as shown in connection with FIGS. 7A-9. The UE 1002 may receive the single MAC-CE from the base station 1004. The single MAC-CE may indicate the one or more downlink TCI states based on a first mapping between a set of downlink TCI states and a first set of codepoints and indicates the one or more uplink TCI states based on a second mapping between a set of uplink TCI states and a second set of codepoints. The first set of codepoints shares one or more codepoints with the second set of codepoints.

In some aspects, the base station 1004 may provide a first MAC-CE and a second MAC-CE. The base station may provide the first MAC-CE and the second MAC-CE to the UE 1002, as shown in connection with FIG. 9. The UE 1002 may receive the first MAC-CE and the second MAC-CE from the base station. The first MAC-CE may indicate the one or more downlink TCI states from the set of downlink TCI states based on a first mapping between a set of downlink TCI states and a first set of codepoints. The second MAC-CE may indicate the one or more uplink TCI states from the set of uplink TCI states based on a second mapping between a set of uplink TCI states and a second set of codepoints. The first set of codepoints may share one or more codepoints with the second set of codepoints.

At 1008, the base station 1004 may provide a DCI. The base station may provide the DCI to the UE 1002, as shown in connection with FIGS. 7A-9. The UE 1002 may receive the DCI from the base station. In some aspects, the DCI may indicate one or more TCI codepoints corresponding to TCI states for uplink or downlink based on a format of the DCI. A first DCI format may be associated with the one or more downlink TCI states and a second DCI format may be associated with the one or more TCI codepoints corresponding to the one or more uplink TCI states. In some aspects, The DCI may indicate one or more TCI codepoints corresponding to TCI states for uplink or downlink based on whether the DCI schedules a PDSCH. A TCI field of the DCI may indicate a downlink TCI codepoint when the DCI schedules the PDSCH. The TCI field of the DCI may indicate an uplink codepoint if the DCI does not schedule the PDSCH. In some aspects, The DCI may indicate one or more TCI codepoints corresponding to TCI states for uplink or downlink based on an indication in the DCI. The DCI may comprise a bit field that may indicate a downlink TCI codepoint or an uplink TCI codepoint.

At 1010, the UE 1002 may apply at least one of the one or more downlink TCI states or the one or more uplink TCI states. The UE may apply at least one of the one or more downlink TCI states or the one or more uplink TCI states based on the activation command and a condition for separate downlink/uplink unified TCI, as shown in connection with FIGS. 7A-9. In some aspects, the condition may include that a single TCI codepoint is activated by the activation command. The single TCI codepoint may correspond to one downlink TCI state and one uplink TCI state. In some aspects, the condition may include that a single downlink TCI state maps to a single TCI codepoint. The single downlink TCI state may be applied to downlink channels. In some aspects, the condition may include that a single uplink TCI state mapped to a single TCI codepoint. The single uplink TCI state is applied to uplink channels. In some aspects, the condition may include that a single downlink TCI state is activated by the activation command. The single downlink TCI state may be applied to downlink channels. In some aspects, the condition may include that a single uplink TCI state is activated by the activation command. The single uplink TCI state may be applied to uplink channels. In some aspects, the condition may include that the activation command indicates a single downlink TCI state or a single uplink TCI state without a TCI codepoint mapping. The activation command may further include at least one first codepoint indicating an uplink TCI state if the activation commands indicates the single downlink TCI state without the TCI codepoint mapping or at least one second codepoint indicating a downlink TCI state if the activation commands indicates the single uplink TCI state without the TCI codepoint mapping. In some aspects, the condition may include the one or more downlink TCI states and the one or more uplink TCI states are separately mapped to an overlapping set or a partially overlapping set of TCI codepoints.

At 1012, the UE 1002 and the base station 1004 may communicate with each other. The UE 1002 and the base station 1004 may communicate with each other based on at least one of the one or more downlink TCI states or the one or more uplink TCI states based on the activation command and the condition for separate downlink/uplink unified TCI, as shown in connection with FIGS. 7A-9.

Figure 11:
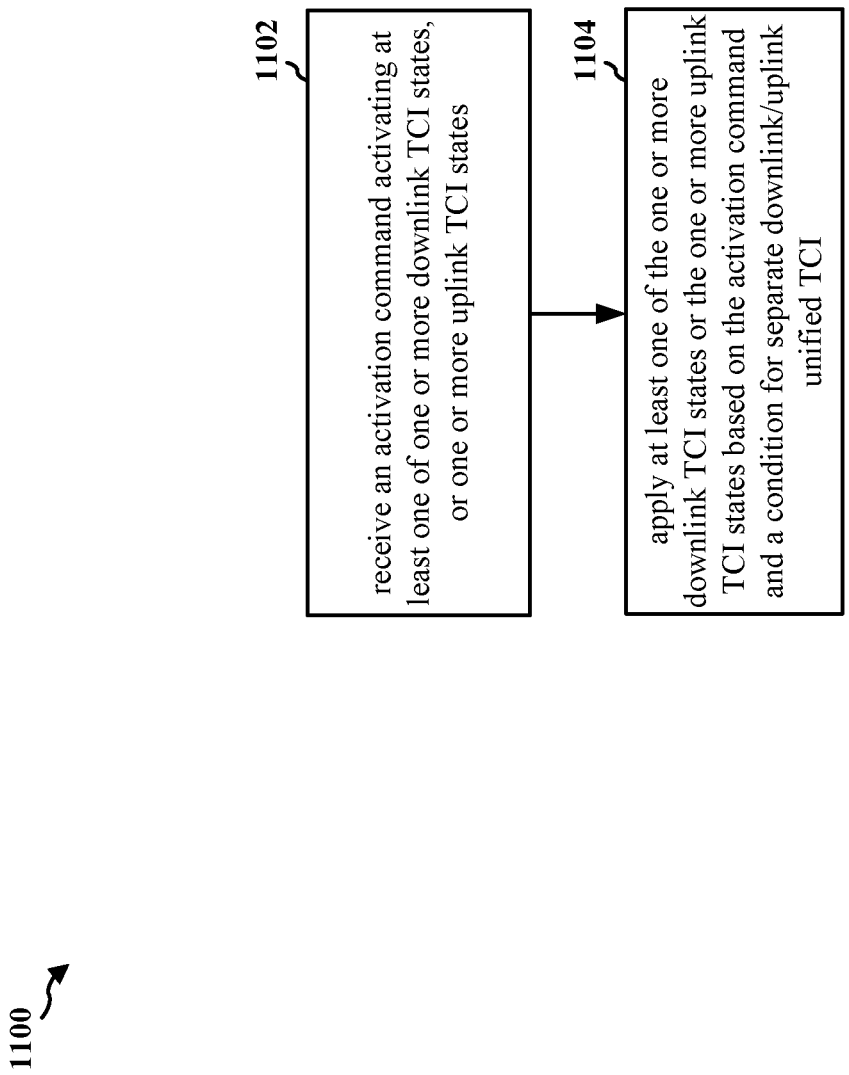
FIG. 11 is a flowchart of a method of wireless communication.

FIG. 11 is a flowchart 1100 of a method of wireless communication. The method may be performed by a UE (e.g., the UE 104; the apparatus 1304). One or more of the illustrated operations may be omitted, transposed, or contemporaneous. The method may configure a UE for separate downlink/uplink beam indication for separate downlink/uplink TCI states.

At 1102, the UE may receive an activation command. For example, 1102 may be performed by TCI component 198 of apparatus 1304. The UE may receive the activation command activating at least one of one or more downlink TCI states or one or more uplink TCI states, as shown in connection with FIGS. 7A-9.

At 1104, the UE may apply at least one of the one or more downlink TCI states or the one or more uplink TCI states. For example, 1104 may be performed by TCI component 198 of apparatus 1304. The UE may apply at least one of the one or more downlink TCI states or the one or more uplink TCI states based on the activation command and a condition for separate downlink/uplink unified TCI, as shown in connection with FIGS. 7A-9. In some aspects, the condition may include that a single TCI codepoint is activated by the activation command. The single TCI codepoint may correspond to one downlink TCI state and one uplink TCI state. In some aspects, the condition may include that a single downlink TCI state mapped to a single TCI codepoint. The single downlink TCI state may be applied to downlink channels. In some aspects, the condition may include that a single uplink TCI state mapped to a single TCI codepoint. The single uplink TCI state is applied to uplink channels. In some aspects, the condition may include that a single downlink TCI state is activated by the activation command. The single downlink TCI state may be applied to downlink channels. In some aspects, the condition may include that a single uplink TCI state is activated by the activation command. The single uplink TCI state may be applied to uplink channels. In some aspects, the condition may include that the activation command indicates a single downlink TCI state or a single uplink TCI state without a TCI codepoint mapping. The activation command may further include at least one first codepoint indicating an uplink TCI state if the activation commands indicates the single downlink TCI state without the TCI codepoint mapping or at least one second codepoint indicating a downlink TCI state if the activation commands indicates the single uplink TCI state without the TCI codepoint mapping. In some aspects, the condition may include the one or more downlink TCI states and the one or more uplink TCI states are separately mapped to an overlapping set or a partially overlapping set of TCI codepoints.

Figure 12:
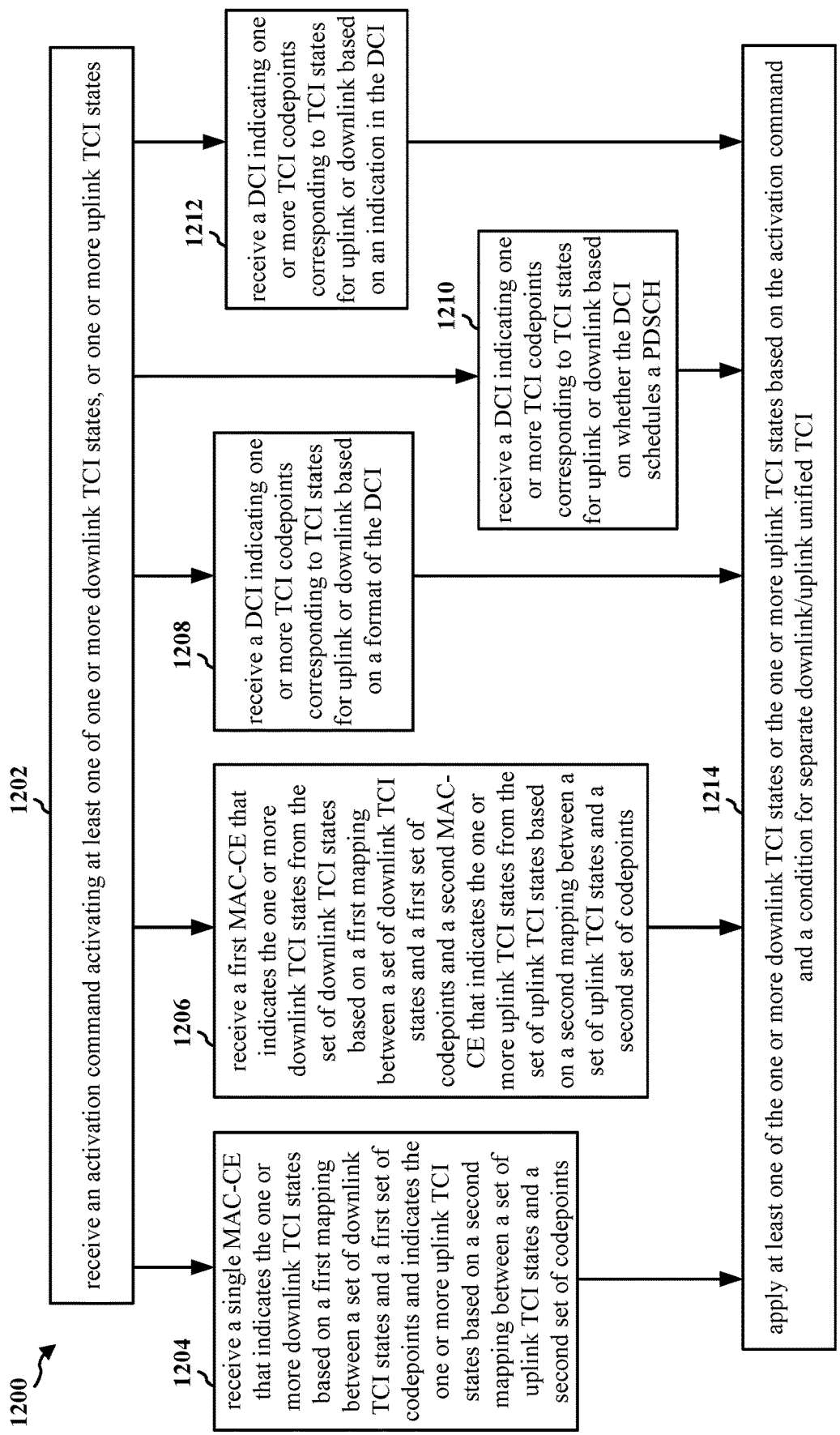
FIG. 12 is a flowchart of a method of wireless communication.

FIG. 12 is a flowchart 1200 of a method of wireless communication. The method may be performed by a UE (e.g., the UE 104; the apparatus 1304). One or more of the illustrated operations may be omitted, transposed, or contemporaneous. The method may configure a UE for separate downlink/uplink beam indication for separate downlink/uplink TCI states.

At 1202, the UE may receive an activation command. For example, 1202 may be performed by TCI component 198 of apparatus 1304. The UE may receive the activation command activating at least one of one or more downlink TCI states or one or more uplink TCI states, as shown in connection with FIGS. 7A-9.

At 1204, the UE may receive a single MAC-CE. For example, 1204 may be performed by TCI component 198 of apparatus 1304. The UE may receive the single MAC-CE that indicates the one or more downlink TCI states based on a first mapping between a set of downlink TCI states and a first set of codepoints and indicates the one or more uplink TCI states based on a second mapping between a set of uplink TCI states and a second set of codepoints. The first set of codepoints may share one or more codepoints with the second set of codepoints. The UE may receive the single MAC-CE as shown in connection with FIGS. 7A-8.

At 1206, the UE may receive a first MAC-CE and a second MAC-CE. For example, 1206 may be performed by TCI component 198 of apparatus 1304. The first MAC-CE may indicate the one or more downlink TCI states from the set of downlink TCI states based on a first mapping between a set of downlink TCI states and a first set of codepoints. The second MAC-CE may indicate the one or more uplink TCI states from the set of uplink TCI states based on a second mapping between a set of uplink TCI states and a second set of codepoints. The first set of codepoints may share one or more codepoints with the second set of codepoints. The UE may receive the first MAC-CE and the second MAC-CE, as shown in connection with FIG. 9.

At 1208, the UE may receive a DCI. For example, 1208 may be performed by TCI component 198 of apparatus 1304. The DCI may indicate one or more TCI codepoints corresponding to TCI states for uplink or downlink based on a format of the DCI, as shown in connection with FIGS. 7A-9. A first DCI format may be associated with the one or more downlink TCI states and a second DCI format may be associated with the one or more TCI codepoints corresponding to the one or more uplink TCI states.

At 1210, the UE may receive a DCI. For example, 1210 may be performed by TCI component 198 of apparatus 1304. The DCI may indicate one or more TCI codepoints corresponding to TCI states for uplink or downlink based on whether the DCI schedules a PDSCH, as shown in connection with FIGS. 7A-9. A TCI field of the DCI may indicate a downlink TCI codepoint when the DCI schedules the PDSCH. The TCI field of the DCI may indicate an uplink codepoint if the DCI does not schedule the PDSCH.

At 1212, the UE may receive a DCI. For example, 1212 may be performed by TCI component 198 of apparatus 1304. The DCI may indicate one or more TCI codepoints corresponding to TCI states for uplink or downlink based on an indication in the DCI, as shown in connection with FIGS. 7A-9. The DCI may comprise a bit field that indicates a downlink TCI codepoint or an uplink TCI codepoint.

At 1214, the UE may apply at least one of the one or more downlink TCI states or the one or more uplink TCI states. For example, 1214 may be performed by TCI component 198 of apparatus 1304. The UE may apply at least one of the one or more downlink TCI states or the one or more uplink TCI states based on the activation command and a condition for separate downlink/uplink unified TCI, as shown in connection with FIGS. 7A-9. In some aspects, the condition may include that a single TCI codepoint is activated by the activation command. The single TCI codepoint may correspond to one downlink TCI state and one uplink TCI state. In some aspects, the condition may include that a single downlink TCI state maps to a single TCI codepoint. The single downlink TCI state may be applied to downlink channels. In some aspects, the condition may include that a single uplink TCI state mapped to a single TCI codepoint. The single uplink TCI state is applied to uplink channels. In some aspects, the condition may include that a single downlink TCI state is activated by the activation command. The single downlink TCI state may be applied to downlink channels. In some aspects, the condition may include that a single uplink TCI state is activated by the activation command. The single uplink TCI state may be applied to uplink channels. In some aspects, the condition may include that the activation command indicates a single downlink TCI state or a single uplink TCI state without a TCI codepoint mapping. The activation command may further include at least one first codepoint indicating an uplink TCI state if the activation commands indicates the single downlink TCI state without the TCI codepoint mapping or at least one second codepoint indicating a downlink TCI state if the activation commands indicates the single uplink TCI state without the TCI codepoint mapping. In some aspects, the condition may include the one or more downlink TCI states and the one or more uplink TCI states are separately mapped to an overlapping set or a partially overlapping set of TCI codepoints.

Figure 13:
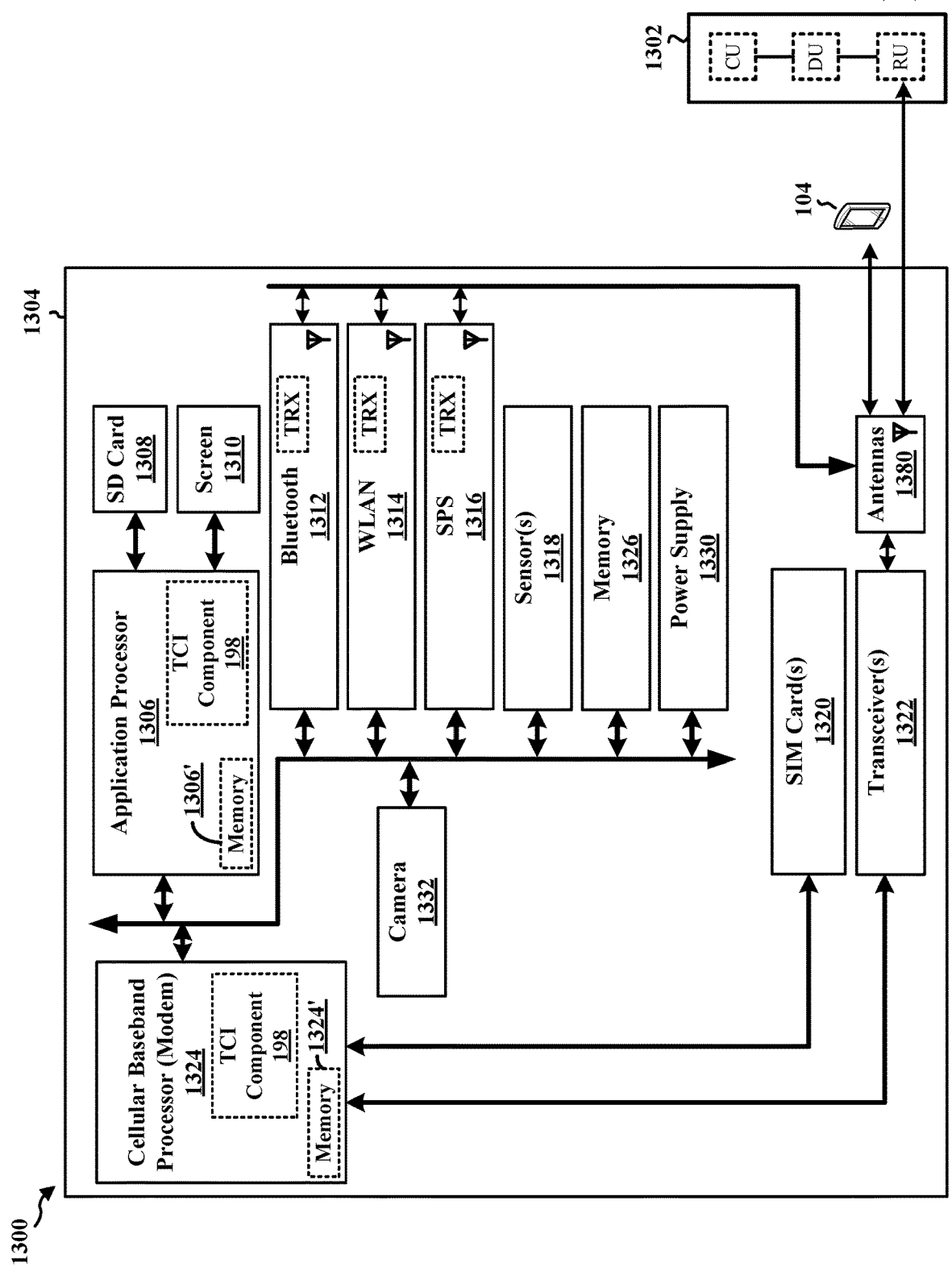
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The computer-readable medium/memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., see 350 of FIG. 3) and include the additional modules of the apparatus 1304.

As discussed supra, the component 198 is configured to receive an activation command activating at least one of one or more downlink TCI states or one or more uplink TCI states; and apply at least one of the one or more downlink TCI states or the one or more uplink TCI states based on the activation command and a condition for separate downlink/uplink unified TCI. The component 198 may be within the cellular baseband processor 1324, the application processor 1306, or both the cellular baseband processor 1324 and the application processor 1306. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1304 may include a variety of components configured for various functions. In one configuration, the apparatus 1304, and in particular the cellular baseband processor 1324 and/or the application processor 1306, includes means for receiving an activation command activating at least one of one or more downlink TCI states one or more uplink TCI states. The apparatus includes means for applying at least one of the one or more downlink TCI states or the one or more uplink TCI states based on the activation command and a condition for separate downlink/uplink unified TCI. The apparatus further includes means for receiving a single MAC-CE that indicates the one or more downlink TCI states based on a first mapping between a set of downlink TCI states and a first set of codepoints and indicates the one or more uplink TCI states based on a second mapping between a set of uplink TCI states and a second set of codepoints. The first set of codepoints shares one or more codepoints with the second set of codepoints. The apparatus further includes means for receiving a first MAC-CE that indicates the one or more downlink TCI states from the set of downlink TCI states based on a first mapping between a set of downlink TCI states and a first set of codepoints and a second MAC-CE that indicates the one or more uplink TCI states from the set of uplink TCI states based on a second mapping between a set of uplink TCI states and a second set of codepoints. The first set of codepoints shares one or more codepoints with the second set of codepoints. The apparatus further includes means for receiving a DCI indicating one or more TCI codepoints corresponding to TCI states for uplink or downlink based on a format of the DCI. A first DCI format is associated with the one or more downlink TCI states and a second DCI format is associated with the one or more TCI codepoints corresponding to the one or more uplink TCI states. The apparatus further includes means for receiving a DCI indicating one or more TCI codepoints corresponding to TCI states for uplink or downlink based on whether the DCI schedules a PDSCH. A TCI field of the DCI indicates a downlink TCI codepoint when the DCI schedules the PDSCH, and the TCI field of the DCI indicates an uplink codepoint if the DCI does not schedule the PDSCH. The apparatus further includes means for receiving a DCI indicating one or more TCI codepoints corresponding to TCI states for uplink or downlink based on an indication in the DCI. The DCI comprises a bit field indicates a downlink TCI codepoint or an uplink TCI codepoint. The means may be the component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
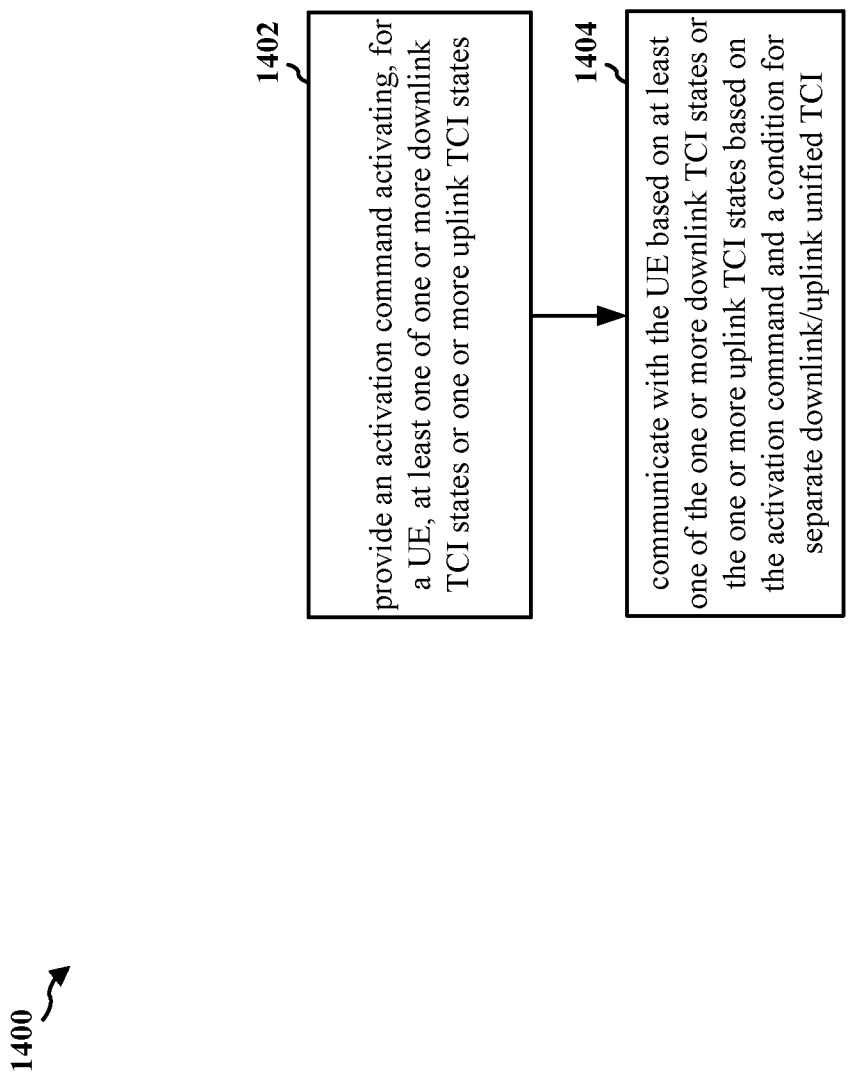
FIG. 14 is a flowchart of a method of wireless communication.

FIG. 14 is a flowchart 1400 of a method of wireless communication. The method may be performed by a base station (e.g., the base station 102; the network entity 1602. One or more of the illustrated operations may be omitted, transposed, or contemporaneous. The method may configure a UE for separate downlink/uplink beam indication for separate downlink/uplink TCI states.

At 1402, the network entity may provide an activation command. For example, 1402 may be performed by TCI component 199 of network entity 1602. The network entity may provide the activation command activating, for a UE, at least one of one or more downlink TCI states or one or more uplink TCI states, as shown in connection with FIGS. 7A-9.

At 1404, the network entity may communicate with the UE. For example, 1404 may be performed by TCI component 199 of network entity 1602. The network entity may communicate with the UE based on at least one of the one or more downlink TCI states or the one or more uplink TCI states based on the activation command and a condition for separate downlink/uplink unified TCI, as shown in connection with FIGS. 7A-9. In some aspects, the condition may include that a single TCI codepoint is activated by the activation command. The single TCI codepoint may correspond to one downlink TCI state and one uplink TCI state. In some aspects, the condition may include that a single downlink TCI state mapped to a single TCI codepoint. The single downlink TCI state may be applied to downlink channels. In some aspects, the condition may include that a single uplink TCI state mapped to a single TCI codepoint. The single uplink TCI state is applied to uplink channels. In some aspects, the condition may include that a single downlink TCI state is activated by the activation command. The single downlink TCI state may be applied to downlink channels. In some aspects, the condition may include that a single uplink TCI state is activated by the activation command. The single uplink TCI state may be applied to uplink channels. In some aspects, the condition may include that the activation command indicates a single downlink TCI state or a single uplink TCI state without a TCI codepoint mapping. The activation command may further include at least one first codepoint indicating an uplink TCI state if the activation commands indicates the single downlink TCI state without the TCI codepoint mapping or at least one second codepoint indicating a downlink TCI state if the activation commands indicates the single uplink TCI state without the TCI codepoint mapping. In some aspects, the condition may include the one or more downlink TCI states and the one or more uplink TCI states are separately mapped to an overlapping set or a partially overlapping set of TCI codepoints.

Figure 15:
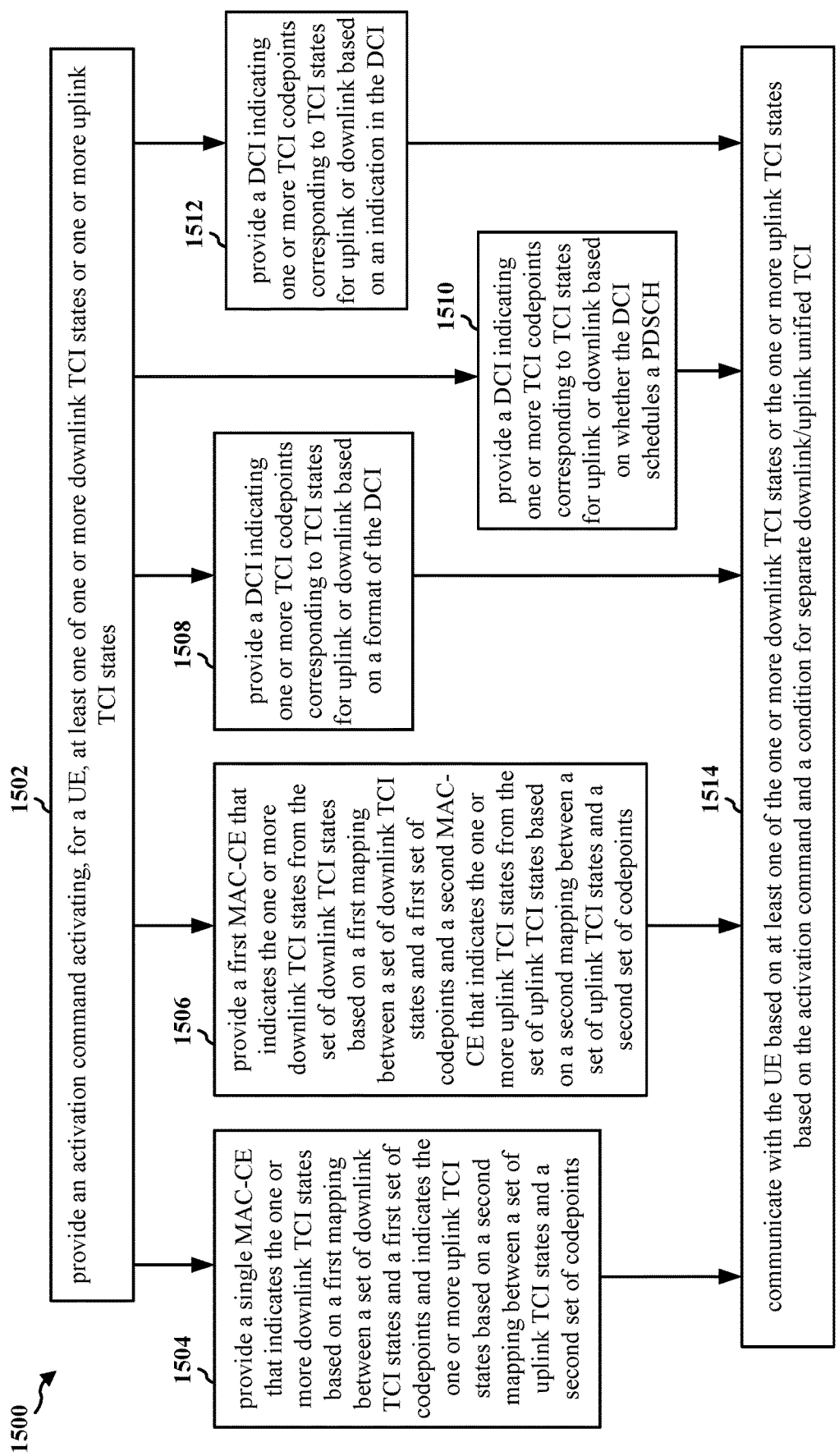
FIG. 15 is a flowchart of a method of wireless communication.

FIG. 15 is a flowchart 1500 of a method of wireless communication. The method may be performed by a base station (e.g., the base station 102; the network entity 1602. One or more of the illustrated operations may be omitted, transposed, or contemporaneous. The method may configure a UE for separate downlink/uplink beam indication for separate downlink/uplink TCI states.

At 1502, the network entity may provide an activation command. For example, 1502 may be performed by TCI component 199 of network entity 1602. The network entity may provide the activation command activating, for a UE, at least one of one or more downlink TCI states or one or more uplink TCI states, as shown in connection with FIGS. 7A-9.

At 1504, the network entity may provide a single MAC-CE. For example, 1504 may be performed by TCI component 199 of network entity 1602. The network entity may provide the single MAC-CE that indicates the one or more downlink TCI states based on a first mapping between a set of downlink TCI states and a first set of codepoints and indicates the one or more uplink TCI states based on a second mapping between a set of uplink TCI states and a second set of codepoints. The first set of codepoints shares one or more codepoints with the second set of codepoints. The network entity may provide the single MAC-CE as shown in connection with FIGS. 7A-8.

At 1506, the network entity may provide a first MAC-CE and a second MAC-CE. For example, 1506 may be performed by TCI component 199 of network entity 1602. The first MAC-CE may indicate the one or more downlink TCI states from the set of downlink TCI states based on a first mapping between a set of downlink TCI states and a first set of codepoints. The second MAC-CE may indicate the one or more uplink TCI states from the set of uplink TCI states based on a second mapping between a set of uplink TCI states and a second set of codepoints. The first set of codepoints may share one or more codepoints with the second set of codepoints. The network entity may provide the first MAC-CE and the second MAC-CE, as shown in connection with FIG. 9.

At 1508, the network entity may provide a DCI. For example, 1508 may be performed by TCI component 199 of network entity 1602. The DCI may indicate one or more TCI codepoints corresponding to TCI states for uplink or downlink based on a format of the DCI, as shown in connection with FIGS. 7A-9. A first DCI format may be associated with the one or more downlink TCI states and a second DCI format may be associated with the one or more TCI codepoints corresponding to the one or more uplink TCI states.

At 1510, the network entity may provide a DCI. For example, 1510 may be performed by TCI component 199 of network entity 1602. The DCI may indicate one or more TCI codepoints corresponding to TCI states for uplink or downlink based on whether the DCI schedules a PDSCH, as shown in connection with FIGS. 7A-9. A TCI field of the DCI may indicate a downlink TCI codepoint when the DCI schedules the PDSCH. The TCI field of the DCI may indicate an uplink codepoint if the DCI does not schedule the PDSCH.

At 1512, the network entity may provide a DCI. For example, 1512 may be performed by TCI component 199 of network entity 1602. The DCI may indicate one or more TCI codepoints corresponding to TCI states for uplink or downlink based on an indication in the DCI, as shown in connection with FIGS. 7A-9. The DCI may comprise a bit field that may indicate a downlink TCI codepoint or an uplink TCI codepoint.

At 1514, the network entity may communicate with the UE. For example, 1514 may be performed by TCI component 199 of network entity 1602. The network entity may communicate with the UE based on at least one of the one or more downlink TCI states or the one or more uplink TCI states based on the activation command and a condition for separate downlink/uplink unified TCI, as shown in connection with FIGS. 7A-9. In some aspects, the condition may include that a single TCI codepoint is activated by the activation command. The single TCI codepoint may correspond to one downlink TCI state and one uplink TCI state. In some aspects, the condition may include that a single downlink TCI state mapped to a single TCI codepoint. The single downlink TCI state may be applied to downlink channels. In some aspects, the condition may include that a single uplink TCI state mapped to a single TCI codepoint. The single uplink TCI state is applied to uplink channels. In some aspects, the condition may include that a single downlink TCI state is activated by the activation command. The single downlink TCI state may be applied to downlink channels. In some aspects, the condition may include that a single uplink TCI state is activated by the activation command. The single uplink TCI state may be applied to uplink channels. In some aspects, the condition may include that the activation command indicates a single downlink TCI state or a single uplink TCI state without a TCI codepoint mapping. The activation command may further include at least one first codepoint indicating an uplink TCI state if the activation commands indicates the single downlink TCI state without the TCI codepoint mapping or at least one second codepoint indicating a downlink TCI state if the activation commands indicates the single uplink TCI state without the TCI codepoint mapping. In some aspects, the condition may include the one or more downlink TCI states and the one or more uplink TCI states are separately mapped to an overlapping set or a partially overlapping set of TCI codepoints.

Figure 16:
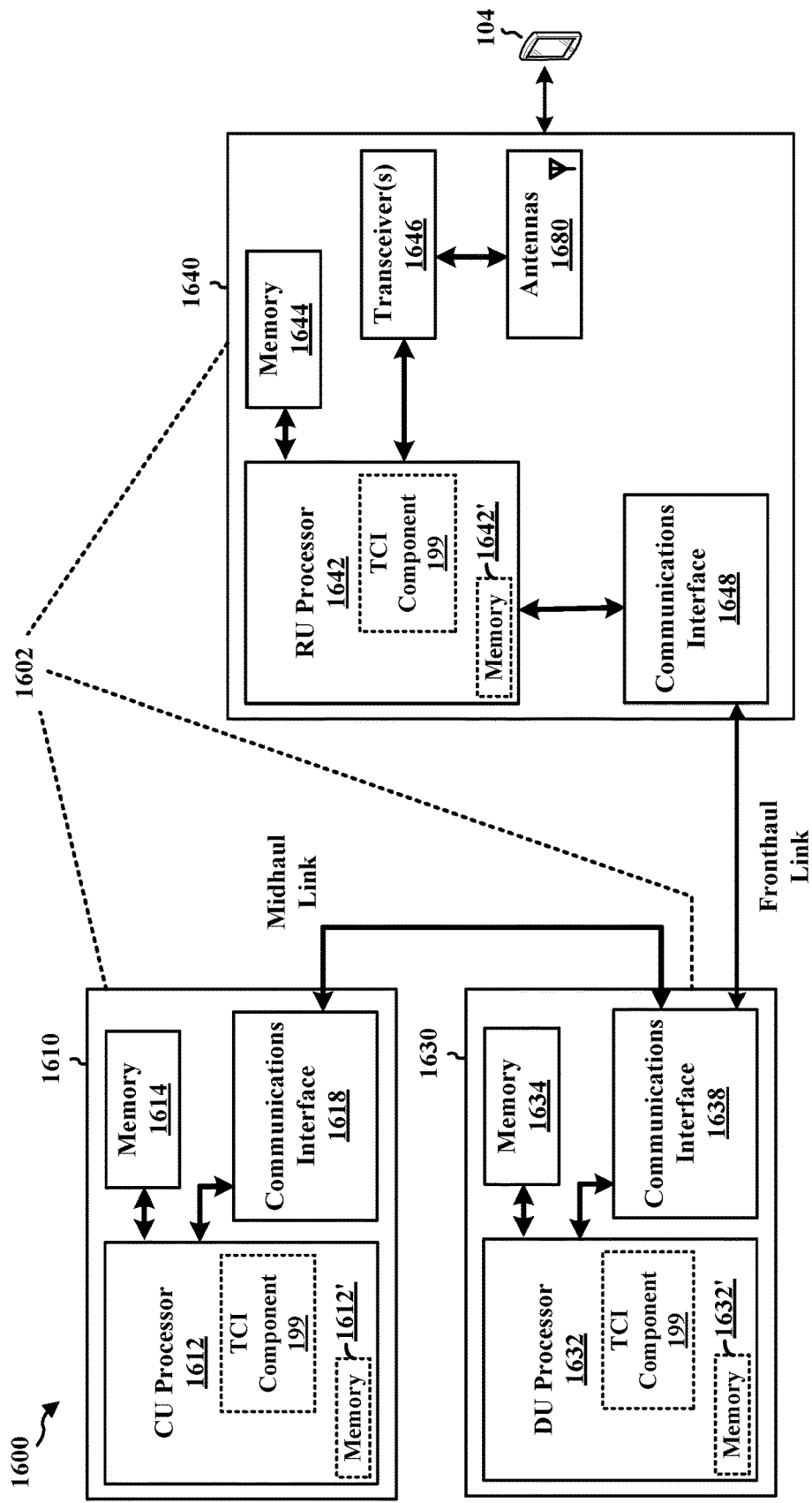
FIG. 16 is a diagram illustrating an example of a hardware implementation for an example network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include a CU processor 1612. The CU processor 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include a DU processor 1632. The DU processor 1632 may include on-chip memory 1632'. In some aspects, the DU 1630 may further include additional memory modules 1634 and a communications interface 1638. The DU 1630 communicates with the RU 1640 through a fronthaul link. The RU 1640 may include an RU processor 1642. The RU processor 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to provide an activation command activating, for a UE, at least one of one or more downlink TCI states or one or more uplink TCI states; and communicate with the UE based on at least one of the one or more downlink TCI states or the one or more uplink TCI states based on the activation command and a condition for separate downlink/uplink unified TCI. The component 199 may be within one or more processors of one or more of the CU 1610, DU 1630, and the RU 1640. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1602 may include a variety of components configured for various functions. In one configuration, the network entity 1602 includes means for providing an activation command activating, for a UE, at least one of one or more downlink TCI states or one or more uplink TCI states. The network entity includes means for communicating with the UE based on at least one of the one or more downlink TCI states or the one or more uplink TCI states based on the activation command and a condition for separate downlink/uplink unified TCI. The network entity further includes means for providing a single MAC-CE that indicates the one or more downlink TCI states based on a first mapping between a set of downlink TCI states and a first set of codepoints and indicates the one or more uplink TCI states based on a second mapping between a set of uplink TCI states and a second set of codepoints. The first set of codepoints shares one or more codepoints with the second set of codepoints. The network entity further includes means for providing a first MAC-CE that indicates the one or more downlink TCI states from the set of downlink TCI states based on a first mapping between a set of downlink TCI states and a first set of codepoints and a second MAC-CE that indicates the one or more uplink TCI states from the set of uplink TCI states based on a second mapping between a set of uplink TCI states and a second set of codepoints. The first set of codepoints shares one or more codepoints with the second set of codepoints. The network entity further includes means for providing a DCI indicating one or more TCI codepoints corresponding to TCI states for uplink or downlink based on a format of the DCI. A first DCI format is associated with the one or more downlink TCI states and a second DCI format is associated with the one or more TCI codepoints corresponding to the one or more uplink TCI states. The network entity further includes means for providing a DCI indicating one or more TCI codepoints corresponding to TCI states for uplink or downlink based on whether the DCI schedules a PDSCH. A TCI field of the DCI indicates a downlink TCI codepoint when the DCI schedules the PDSCH, and the TCI field of the DCI indicates an uplink codepoint if the DCI does not schedule the PDSCH. The network entity further includes means for providing a DCI indicating one or more TCI codepoints corresponding to TCI states for uplink or downlink based on an indication in the DCI. The DCI comprises a bit field indicates a downlink TCI codepoint or an uplink TCI codepoint. The means may be the component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

Aspects presented herein provide a configuration for separate downlink/uplink beam indication for separate downlink/uplink TCI states. A UE may be configured to apply at least one of one or more downlink TCI states or one or more uplink TCI states based on an activation command and a condition for separate downlink/uplink unified TCI. The activation command may indicate at least one of one or more downlink TCI states or one or more uplink TCI states. The activation command and the condition may be utilized to determine the uplink and/or downlink TCI states.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE comprising receiving an activation command activating at least one of one or more downlink TCI states or one or more uplink TCI states; and applying at least one of the one or more downlink TCI states or the one or more uplink TCI states based on the activation command and a condition for separate downlink/uplink unified TCI.

Aspect 2 is the method of aspect 1, further includes that the condition includes that a single TCI codepoint is activated by the activation command, wherein the single TCI codepoint corresponds to one downlink TCI state and one uplink TCI state.

Aspect 3 is the method of any of aspects 1 and 2, further includes that the condition includes that a single downlink TCI state or a single uplink TCI state mapped to a single TCI codepoint, wherein the single downlink TCI state is applied to downlink channels, wherein the single uplink TCI state is applied to uplink channels.

Aspect 4 is the method of any of aspects 1-3, further includes that the condition includes that a single downlink TCI state is activated by the activation command, wherein the single downlink TCI state is applied to downlink channels.

Aspect 5 is the method of any of aspects 1-4, further includes that the condition includes that a single uplink TCI state is activated by the activation command, wherein the single uplink TCI state is applied to uplink channels.

Aspect 6 is the method of any of aspects 1-5, further includes that the condition includes that the activation command indicates a single downlink TCI state or a single uplink TCI state without a TCI codepoint mapping.

Aspect 7 is the method of any of aspects 1-6, further includes that at least one first codepoint indicating an uplink TCI state if the activation commands indicates the single downlink TCI state without the TCI codepoint mapping or at least one second codepoint indicating a downlink TCI state if the activation commands indicates the single uplink TCI state without the TCI codepoint mapping.

Aspect 8 is the method of any of aspects 1-9, further includes that the condition includes the one or more downlink TCI states and the one or more uplink TCI states are separately mapped to an overlapping set or a partially overlapping set of TCI codepoints.

Aspect 9 is the method of any of aspects 1-8, further including receiving a single MAC-CE that indicates the one or more downlink TCI states based on a first mapping between a set of downlink TCI states and a first set of codepoints and indicates the one or more uplink TCI states based on a second mapping between a set of uplink TCI states and a second set of codepoints, wherein the first set of codepoints shares one or more codepoints with the second set of codepoints.

Aspect 10 is the method of any of aspects 1-9, further including receiving a first MAC-CE that indicates the one or more downlink TCI states from the set of downlink TCI states based on a first mapping between a set of downlink TCI states and a first set of codepoints and a second MAC-CE that indicates the one or more uplink TCI states from the set of uplink TCI states based on a second mapping between a set of uplink TCI states and a second set of codepoints, wherein the first set of codepoints shares one or more codepoints with the second set of codepoints.

Aspect 11 is the method of any of aspects 1-10, further including receiving a DCI indicating one or more TCI codepoints corresponding to TCI states for uplink or downlink based on a format of the DCI, wherein a first DCI format is associated with the one or more downlink TCI states and a second DCI format is associated with the one or more TCI codepoints corresponding to the one or more uplink TCI states.

Aspect 12 is the method of any of aspects 1-11, further including receiving a DCI indicating one or more TCI codepoints corresponding to TCI states for uplink or downlink based on whether the DCI schedules a PDSCH, wherein a TCI field of the DCI indicates a downlink TCI codepoint when the DCI schedules the PDSCH, and the TCI field of the DCI indicates an uplink codepoint if the DCI does not schedule the PDSCH.

Aspect 13 is the method of any of aspects 1-12, further including receiving a DCI indicating one or more TCI codepoints corresponding to TCI states for uplink or downlink based on an indication in the DCI, wherein the DCI comprises a bit field indicates a downlink TCI codepoint or an uplink TCI codepoint.

Aspect 14 is an apparatus for wireless communication at a UE including at least one processor coupled to a memory and at least one transceiver, the at least one processor configured to implement any of Aspects 1-13.

Aspect 15 is an apparatus for wireless communication at a UE including means for implementing any of Aspects 1-13.

Aspect 16 is a computer-readable medium storing computer executable code, where the code when executed by a processor causes the processor to implement any of Aspects 1-13.

Aspect 17 is a method of wireless communication at a network node comprising providing an activation command activating, for a UE, at least one of one or more downlink TCI states or one or more uplink TCI states; and communicating with the UE based on at least one of the one or more downlink TCI states or the one or more uplink TCI states based on the activation command and a condition for separate downlink/uplink unified TCI.

Aspect 18 is the method of aspect 17, further includes that the condition includes that a single TCI codepoint is activated by the activation command, wherein the single TCI codepoint corresponds to one downlink TCI state and one uplink TCI state.

Aspect 19 is the method of any of aspects 17 and 18, further includes that the condition includes that a single downlink TCI state or a single uplink TCI state mapped to a single TCI codepoint, wherein the single downlink TCI state is applied to downlink channels, wherein the single uplink TCI state is applied to uplink channels.

Aspect 20 is the method of any of aspects 17-19, further includes that the condition includes that a single downlink TCI state is activated by the activation command, wherein the single downlink TCI state is applied to downlink channels.

Aspect 21 is the method of any of aspects 17-20, further includes that the condition includes that a single uplink TCI state is activated by the activation command, wherein the single uplink TCI state is applied to uplink channels.

Aspect 22 is the method of any of aspects 17-21, further includes that the condition includes that the activation command indicates a single downlink TCI state or a single uplink TCI state without a TCI codepoint mapping.

Aspect 23 is the method of any of aspects 17-22, further includes that the activation command further includes at least one first codepoint indicating an uplink TCI state if the activation commands indicates the single downlink TCI state without the TCI codepoint mapping or at least one second codepoint indicating a downlink TCI state if the activation commands indicates the single uplink TCI state without the TCI codepoint mapping.

Aspect 24 is the method of any of aspects 17-23, further includes that the condition includes the one or more downlink TCI states and the one or more uplink TCI states are separately mapped to an overlapping set or a partially overlapping set of TCI codepoints.

Aspect 25 is the method of any of aspects 17-24, further including providing a single MAC-CE that indicates the one or more downlink TCI states based on a first mapping between a set of downlink TCI states and a first set of codepoints and indicates the one or more uplink TCI states based on a second mapping between a set of uplink TCI states and a second set of codepoints, wherein the first set of codepoints shares one or more codepoints with the second set of codepoints.

Aspect 26 is the method of any of aspects 17-25, further including providing a first MAC-CE that indicates the one or more downlink TCI states from the set of downlink TCI states based on a first mapping between a set of downlink TCI states and a first set of codepoints and a second MAC-CE that indicates the one or more uplink TCI states from the set of uplink TCI states based on a second mapping between a set of uplink TCI states and a second set of codepoints, wherein the first set of codepoints shares one or more codepoints with the second set of codepoints.

Aspect 27 is the method of any of aspects 17-26, further including providing a DCI indicating one or more TCI codepoints corresponding to TCI states for uplink or downlink based on a format of the DCI, wherein a first DCI format is associated with the one or more downlink TCI states and a second DCI format is associated with the one or more TCI codepoints corresponding to the one or more uplink TCI states.

Aspect 28 is the method of any of aspects 17-27, further including provide a DCI indicating one or more TCI codepoints corresponding to TCI states for uplink or downlink based on whether the DCI schedules a PDSCH, wherein a TCI field of the DCI indicates a downlink TCI codepoint when the DCI schedules the PDSCH, and the TCI field of the DCI indicates an uplink codepoint if the DCI does not schedule the PDSCH.

Aspect 29 is the method of any of aspects 17-28, further including providing a DCI indicating one or more TCI codepoints corresponding to TCI states for uplink or downlink based on an indication in the DCI, wherein the DCI comprises a bit field indicates a downlink TCI codepoint or an uplink TCI codepoint.

Aspect 30 is an apparatus for wireless communication at a UE including at least one processor coupled to a memory and at least one transceiver, the at least one processor configured to implement any of Aspects 17-29.

Aspect 31 is an apparatus for wireless communication at a UE including means for implementing any of Aspects 17-29.

Aspect 32 is a computer-readable medium storing computer executable code, where the code when executed by a processor causes the processor to implement any of Aspects 17-29.

What is claimed is:

1. An apparatus for wireless communication at a user equipment comprising:
 a memory; and
 at least one processor coupled to the memory and, based at least in part on information stored in the memory, the at least one processor is configured to:
  receive an activation command activating at least one of:
   one or more downlink transmission configuration indicator (TCI) states, or
   one or more uplink TCI states; and
  apply at least one of the one or more downlink TCI states or the one or more uplink TCI states based on the activation command and a condition for separate downlink/uplink unified TCI, wherein the condition includes that the activation command indicates a single downlink TCI state or a single uplink TCI state without a TCI codepoint mapping.

2. The apparatus of claim 1, further comprising a transceiver coupled to the at least one processor.

3. The apparatus of claim 1, wherein the single downlink TCI state is applied to downlink channels, wherein the single uplink TCI state is applied to uplink channels.

4. The apparatus of claim 1, wherein the activation command further includes:
 at least one first codepoint indicating an uplink TCI state if the activation command indicates the single downlink TCI state without the TCI codepoint mapping, or
 at least one second codepoint indicating a downlink TCI state if the activation command indicates the single uplink TCI state without the TCI codepoint mapping.

5. An apparatus for wireless communication at a user equipment (UE), comprising:
 a memory; and
 at least one processor coupled to the memory and, based at least in part on information stored in the memory, the at least one processor is configured to:
  receive an activation command activating at least one of:
   one or more downlink transmission configuration indicator (TCI) states, or
   one or more uplink TCI states; and
  apply at least one of the one or more downlink TCI states or the one or more uplink TCI states based on the activation command and a condition for separate downlink/uplink unified TCI, wherein the condition includes the one or more downlink TCI states and the one or more uplink TCI states are separately mapped to an overlapping set or a partially overlapping set of TCI codepoints.

6. The apparatus of claim 5, wherein the at least one processor is configured to:
 receive a single medium access control-control element (MAC-CE) that indicates the one or more downlink TCI states based on a first mapping between a set of downlink TCI states and a first set of codepoints and indicates the one or more uplink TCI states based on a second mapping between a set of uplink TCI states and a second set of codepoints, wherein the first set of codepoints shares one or more codepoints with the second set of codepoints.

7. The apparatus of claim 5, wherein the at least one processor is configured to:
 receive a first medium access control-control element (MAC-CE) that indicates the one or more downlink TCI states from the set of downlink TCI states based on a first mapping between a set of downlink TCI states and a first set of codepoints and a second MAC-CE that indicates the one or more uplink TCI states from the set of uplink TCI states based on a second mapping between a set of uplink TCI states and a second set of codepoints, wherein the first set of codepoints shares one or more codepoints with the second set of codepoints.

8. The apparatus of claim 5, wherein the at least one processor is configured to:
 receive a downlink control indicator (DCI) indicating one or more TCI codepoints corresponding to TCI states for uplink or downlink based on a format of the DCI, wherein a first DCI format is associated with the one or more downlink TCI states and a second DCI format is associated with the one or more TCI codepoints corresponding to the one or more uplink TCI states.

9. The apparatus of claim 5, wherein the at least one processor is configured to:
 receive a downlink control indicator (DCI) indicating one or more TCI codepoints corresponding to TCI states for uplink or downlink based on whether the DCI schedules a physical downlink shared channel (PDSCH), wherein a TCI field of the DCI indicates a downlink TCI codepoint when the DCI schedules the PDSCH, and the TCI field of the DCI indicates an uplink codepoint if the DCI does not schedule the PDSCH.

10. The apparatus of claim 5, wherein the at least one processor is configured to:
 receive a downlink control indicator (DCI) indicating one or more TCI codepoints corresponding to TCI states for uplink or downlink based on an indication in the DCI, wherein the DCI comprises a bit field indicates a downlink TCI codepoint or an uplink TCI codepoint.

11. An apparatus for wireless communication at a network node, comprising:
a memory; and
at least one processor coupled to the memory and, based at least in part on information stored in the memory, the at least one processor is configured to:
provide an activation command that activates, for a user equipment (UE), at least one of:
one or more downlink transmission configuration indicator (TCI) states, or
one or more uplink TCI states; and
communicate with the UE based on at least one of the one or more downlink TCI states or the one or more uplink TCI states based on the activation command and a condition for separate downlink/uplink unified TCI, wherein the condition includes that the activation command indicates a single downlink TCI state or a single uplink TCI state without a TCI codepoint mapping.

12. The apparatus of claim 11, further comprising a transceiver coupled to the at least one processor.

13. The apparatus of claim 11, wherein the single downlink TCI state is applied to downlink channels, wherein the single uplink TCI state is applied to uplink channels.

14. The apparatus of claim 11, wherein the activation command further includes:
at least one first codepoint indicating an uplink TCI state if the activation command indicates the single downlink TCI state without the TCI codepoint mapping, or
at least one second codepoint indicating a downlink TCI state if the activation command indicates the single uplink TCI state without the TCI codepoint mapping.

15. An apparatus for wireless communication at a user equipment (UE), comprising:
a memory; and
at least one processor coupled to the memory and, based at least in part on information stored in the memory, the at least one processor is configured to:
receive an activation command activating at least one of:
one or more downlink transmission configuration indicator (TCI) states, or
one or more uplink TCI states; and
apply at least one of the one or more downlink TCI states or the one or more uplink TCI states based on the activation command and a condition for separate downlink/uplink unified TCI, wherein the condition includes the one or more downlink TCI states and the one or more uplink TCI states are separately mapped to an overlapping set or a partially overlapping set of TCI codepoints.

16. The apparatus of claim 15, wherein the at least one processor is configured to:
provide a single medium access control-control element (MAC-CE) that indicates the one or more downlink TCI states based on a first mapping between a set of downlink TCI states and a first set of codepoints and indicates the one or more uplink TCI states based on a second mapping between a set of uplink TCI states and a second set of codepoints, wherein the first set of codepoints shares one or more codepoints with the second set of codepoints.

17. The apparatus of claim 15, wherein the at least one processor is configured to:
provide a first medium access control-control element (MAC-CE) that indicates the one or more downlink TCI states from the set of downlink TCI states based on a first mapping between a set of downlink TCI states and a first set of codepoints and a second MAC-CE that indicates the one or more uplink TCI states from the set of uplink TCI states based on a second mapping between a set of uplink TCI states and a second set of codepoints, wherein the first set of codepoints shares one or more codepoints with the second set of codepoints.

18. The apparatus of claim 15, wherein the at least one processor is configured to:
provide a downlink control indicator (DCI) indicating one or more TCI codepoints corresponding to TCI states for uplink or downlink based on a format of the DCI, wherein a first DCI format is associated with the one or more downlink TCI states and a second DCI format is associated with the one or more TCI codepoints corresponding to the one or more uplink TCI states.

19. The apparatus of claim 15, wherein the at least one processor is configured to:
provide a downlink control indicator (DCI) indicating one or more TCI codepoints corresponding to TCI states for uplink or downlink based on whether the DCI schedules a physical downlink shared channel (PDSCH), wherein a TCI field of the DCI indicates a downlink TCI codepoint when the DCI schedules the PDSCH, and the TCI field of the DCI indicates an uplink codepoint if the DCI does not schedule the PDSCH.

20. The apparatus of claim 15, wherein the at least one processor is configured to:
provide a downlink control indicator (DCI) indicating one or more TCI codepoints corresponding to TCI states for uplink or downlink based on an indication in the DCI, wherein the DCI comprises a bit field indicates a downlink TCI codepoint or an uplink TCI codepoint.

* * * * *